United States Patent
Steiner

(10) Patent No.: US 11,433,587 B2
(45) Date of Patent: Sep. 6, 2022

(54) METHOD AND DEVICE FOR PRODUCING COMPONENTS OR PROFILES

(71) Applicant: Gottfried Steiner, Spielberg (AT)

(72) Inventor: Gottfried Steiner, Spielberg (AT)

( * ) Notice: Subject to any disclaimer, the term of this patent is extended or adjusted under 35 U.S.C. 154(b) by 189 days.

(21) Appl. No.: 16/494,716

(22) PCT Filed: Mar. 13, 2018

(86) PCT No.: PCT/EP2018/056137
§ 371 (c)(1),
(2) Date: Sep. 16, 2019

(87) PCT Pub. No.: WO2018/172128
PCT Pub. Date: Sep. 27, 2018

(65) Prior Publication Data
US 2020/0094460 A1    Mar. 26, 2020

(30) Foreign Application Priority Data

Mar. 20, 2017 (AT) .............................. A 50215/2017

(51) Int. Cl.
*B29C 45/36* (2006.01)
*B29C 45/56* (2006.01)
(Continued)

(52) U.S. Cl.
CPC ........ *B29C 45/561* (2013.01); *B29C 45/0416* (2013.01); *B29C 45/062* (2013.01);
(Continued)

(58) Field of Classification Search
CPC ............ B29C 45/1751; B29C 45/1703; B29C 45/1705; B29C 45/56; B29C 45/04; B29C 45/26
See application file for complete search history.

(56) References Cited

U.S. PATENT DOCUMENTS 7,871,261 B2 * 1/2011 Steiner ................... B29C 45/56
425/577
9,662,817 B2 * 5/2017 Montes de Oca Balderas ............
B29C 45/1705
(Continued)

FOREIGN PATENT DOCUMENTS

DE              893120 C      10/1953
DE      102008056052 A1       9/2009
(Continued)

*Primary Examiner* — Joseph S Del Sole
*Assistant Examiner* — Thu-Khanh T. Nguyen
(74) *Attorney, Agent, or Firm* — Maschoff Brennan

(57) ABSTRACT

A method for producing components or profiles from at least one solidifiable plastic compound in an injection moulding facility, said method comprising stationary mould components and mould components which are movable with respect thereto. The method includes injection of solidifiable plastic compound into a channel formed in the movable mould components and, from there, via connections either in portions into one or more mould cavities. The channel is enclosed by at least one stationary, temperature-controlled mould component. A continuous channel compound strand is formed with attachment compound strands, which is transported away from the injection point with increasing cooling and solidification and increasing length, together with the filled mould cavities and mould cavity portions. The channel compound strand, together with the connection mass strands, after its solidification and after opening the mould cavity or the mould cavities is separated from the component(s), and the component or the components is/are ejected.

11 Claims, 20 Drawing Sheets

Figure 4C:
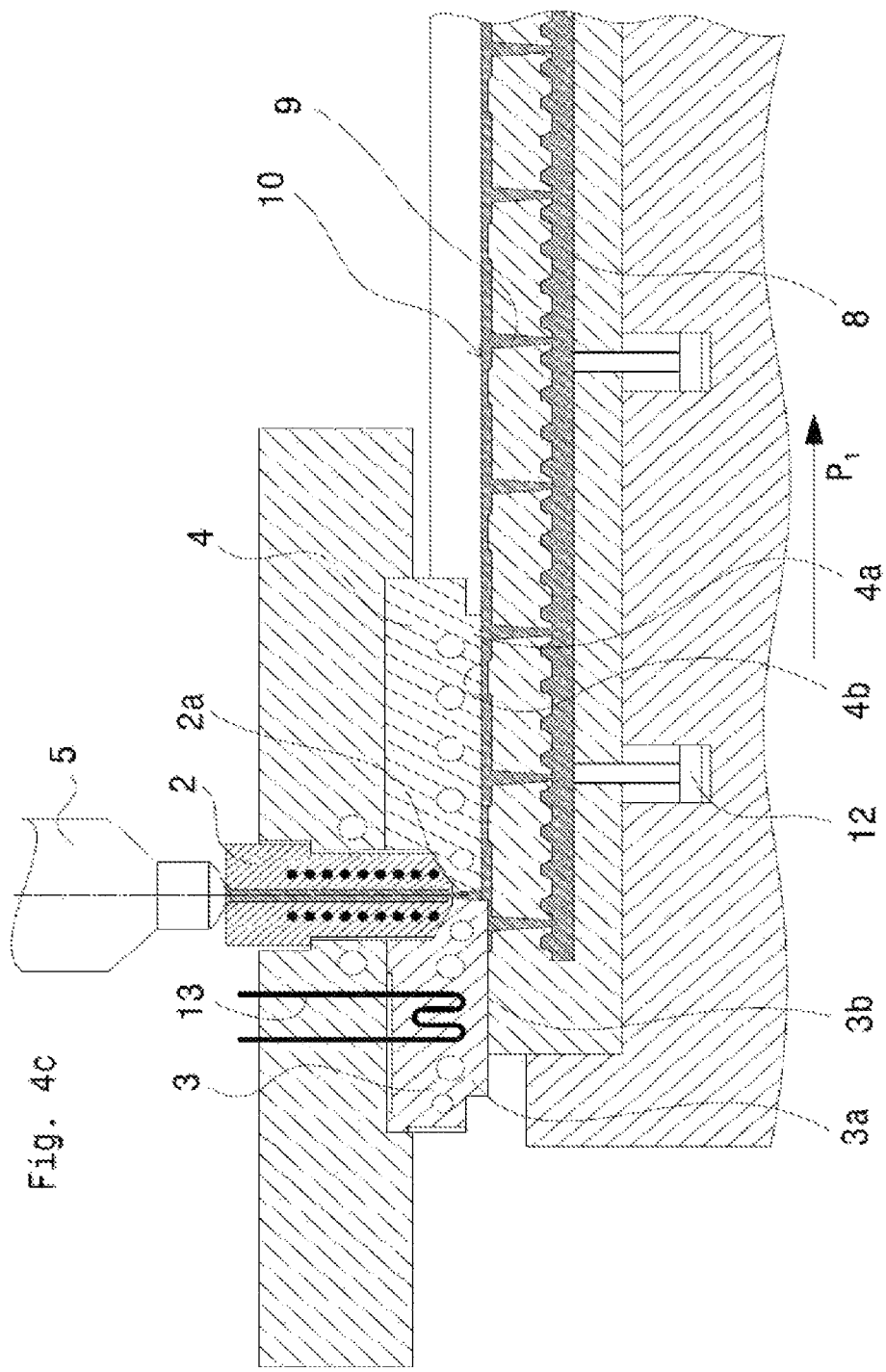
Figure 10:
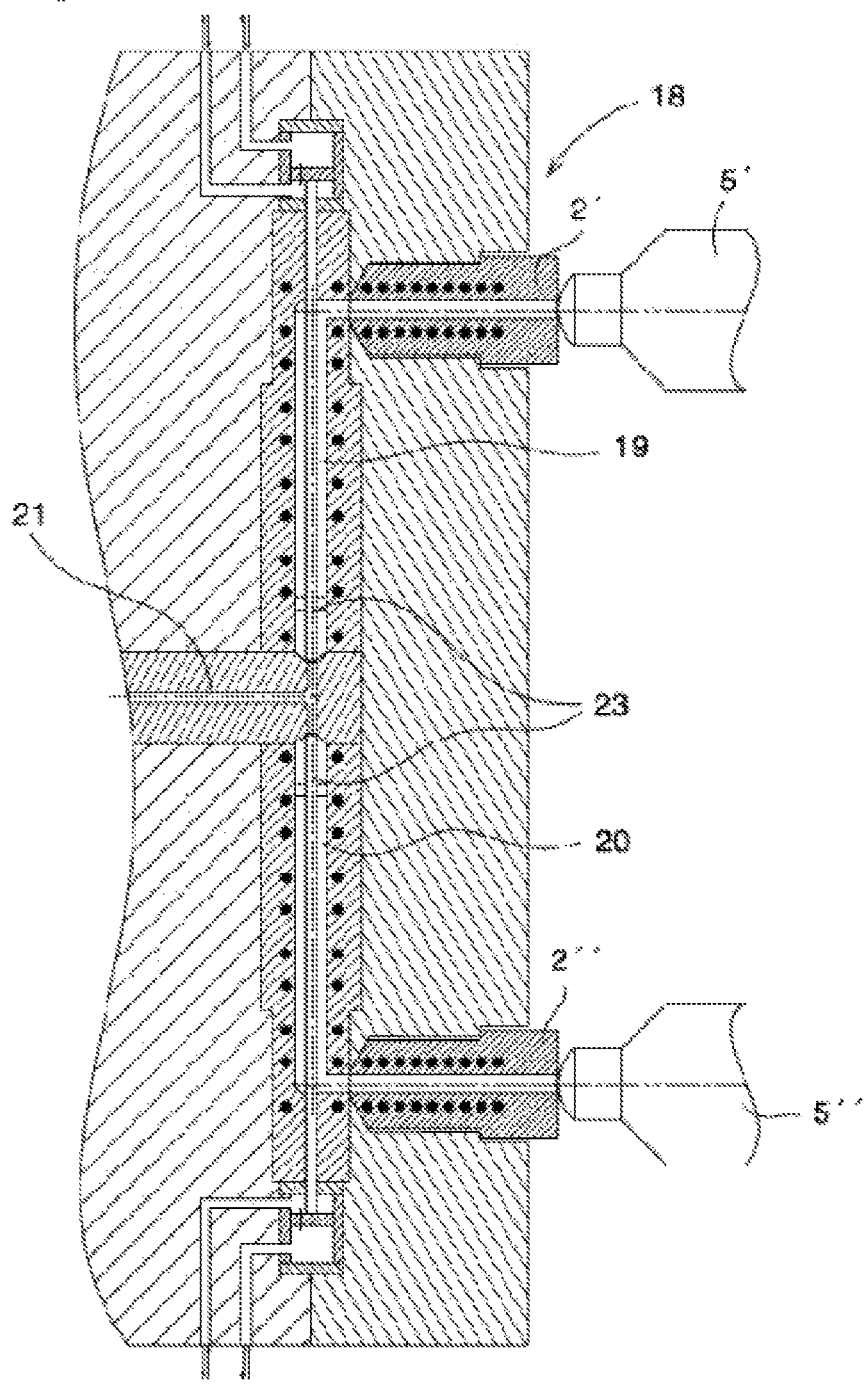

(51) Int. Cl.
  *B29C 45/04*  (2006.01)
  *B29C 45/06*  (2006.01)
  *B29C 45/40*  (2006.01)
  *B29C 45/73*  (2006.01)
  *B29C 45/00*  (2006.01)

(52) U.S. Cl.
  CPC .............. *B29C 45/40* (2013.01); *B29C 45/73* (2013.01); *B29C 2045/0089* (2013.01)

(56) References Cited

U.S. PATENT DOCUMENTS

| | | | |
|---|---|---|---|
| 10,384,403 B2 | 8/2019 | Stadler et al. | |
| 2008/0251963 A1* | 10/2008 | Steiner .................... | B29C 45/56 |
| | | | 264/151 |
| 2010/0221500 A1* | 9/2010 | Steiner .................... | B29C 45/56 |
| | | | 425/149 |
| 2011/0089589 A1 | 4/2011 | DeCusatis et al. | |
| 2011/0212301 A1 | 9/2011 | Berkemeier et al. | |
| 2014/0167318 A1 | 6/2014 | Forsthovel et al. | |

FOREIGN PATENT DOCUMENTS

| | | |
|---|---|---|
| DE | 102015003206 A1 | 9/2016 |
| EP | 2205420 A1 | 7/2010 |
| EP | 2712721 A1 | 4/2014 |
| EP | 2746026 A2 | 6/2014 |
| WO | 2016/097012 A1 | 6/2016 |

\* cited by examiner

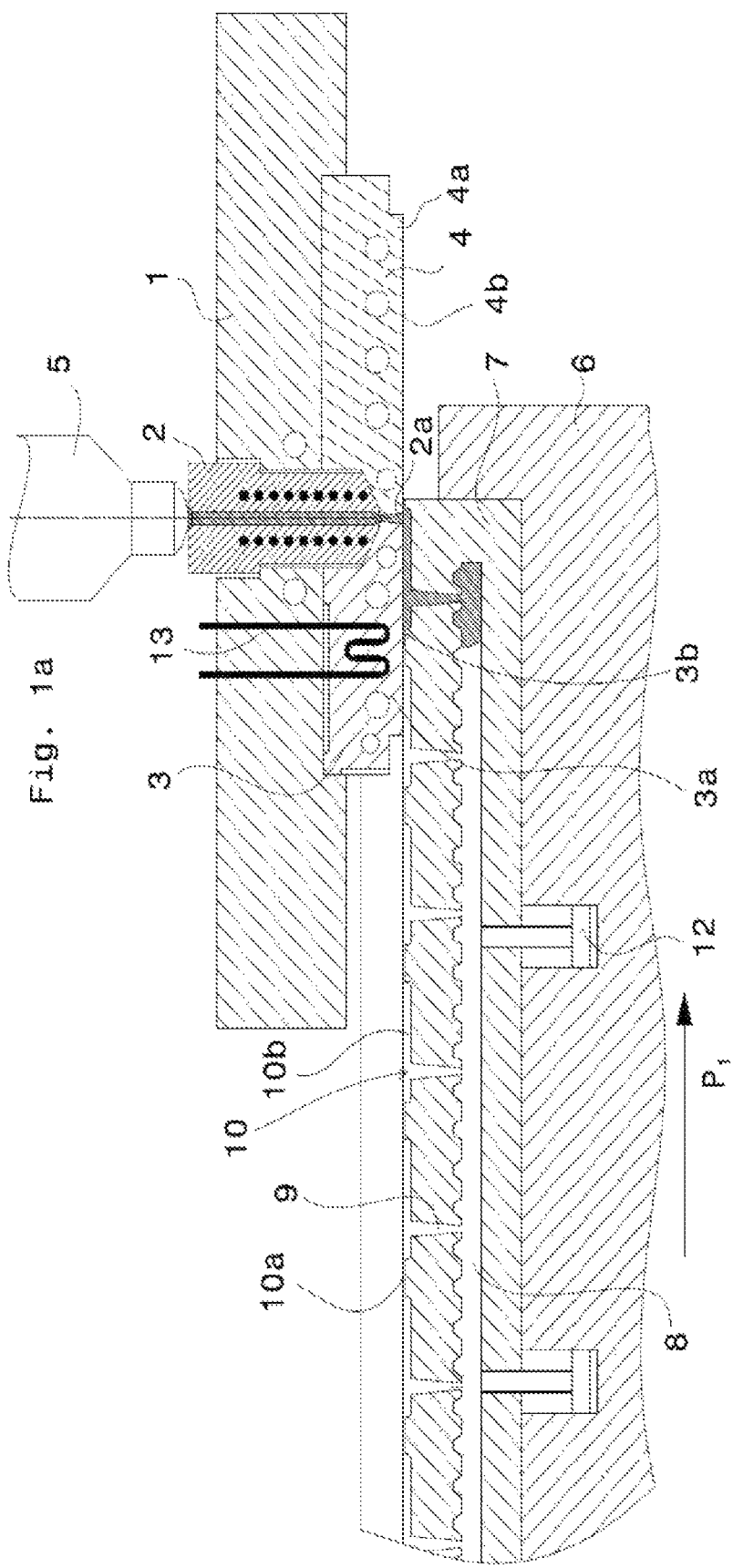

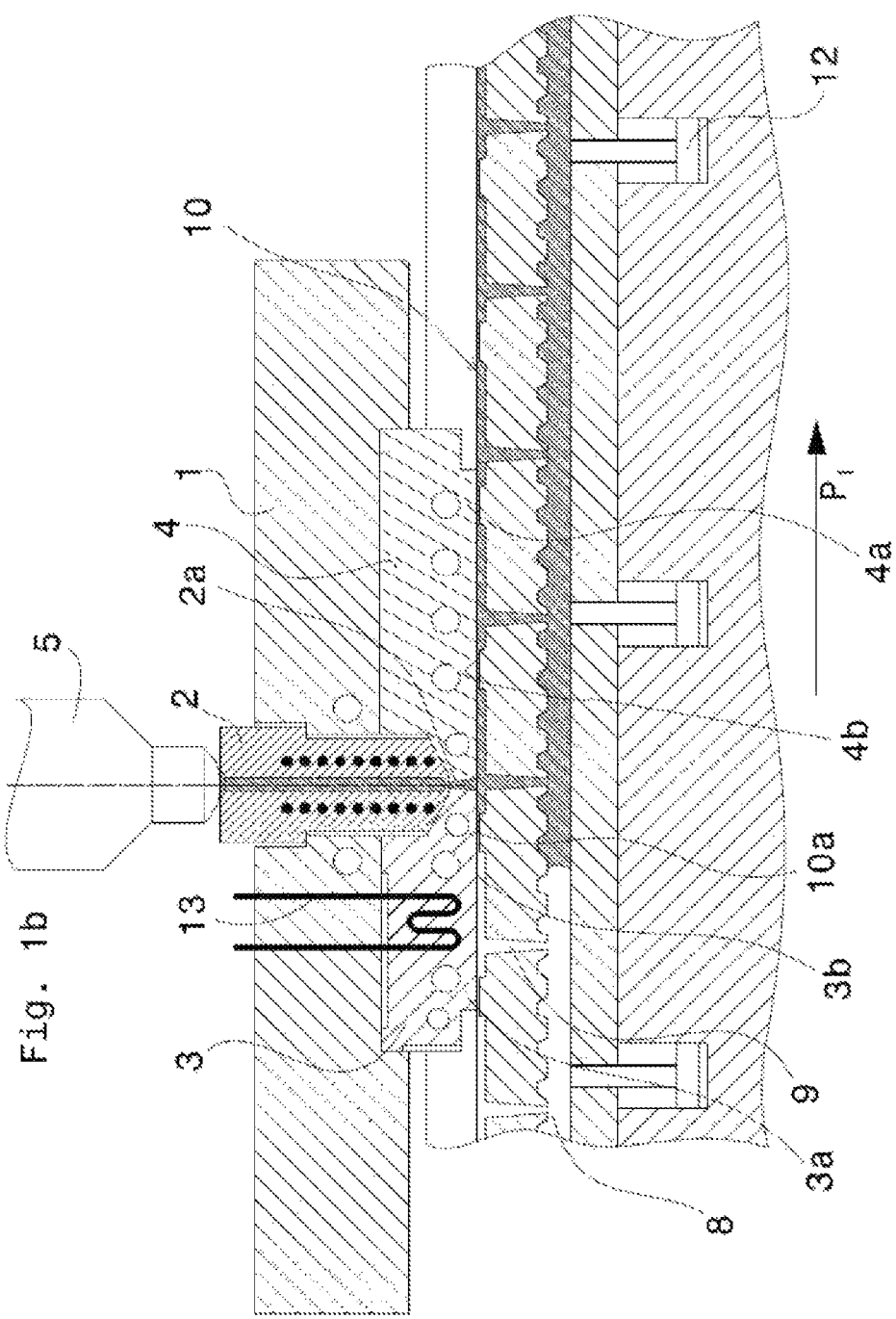

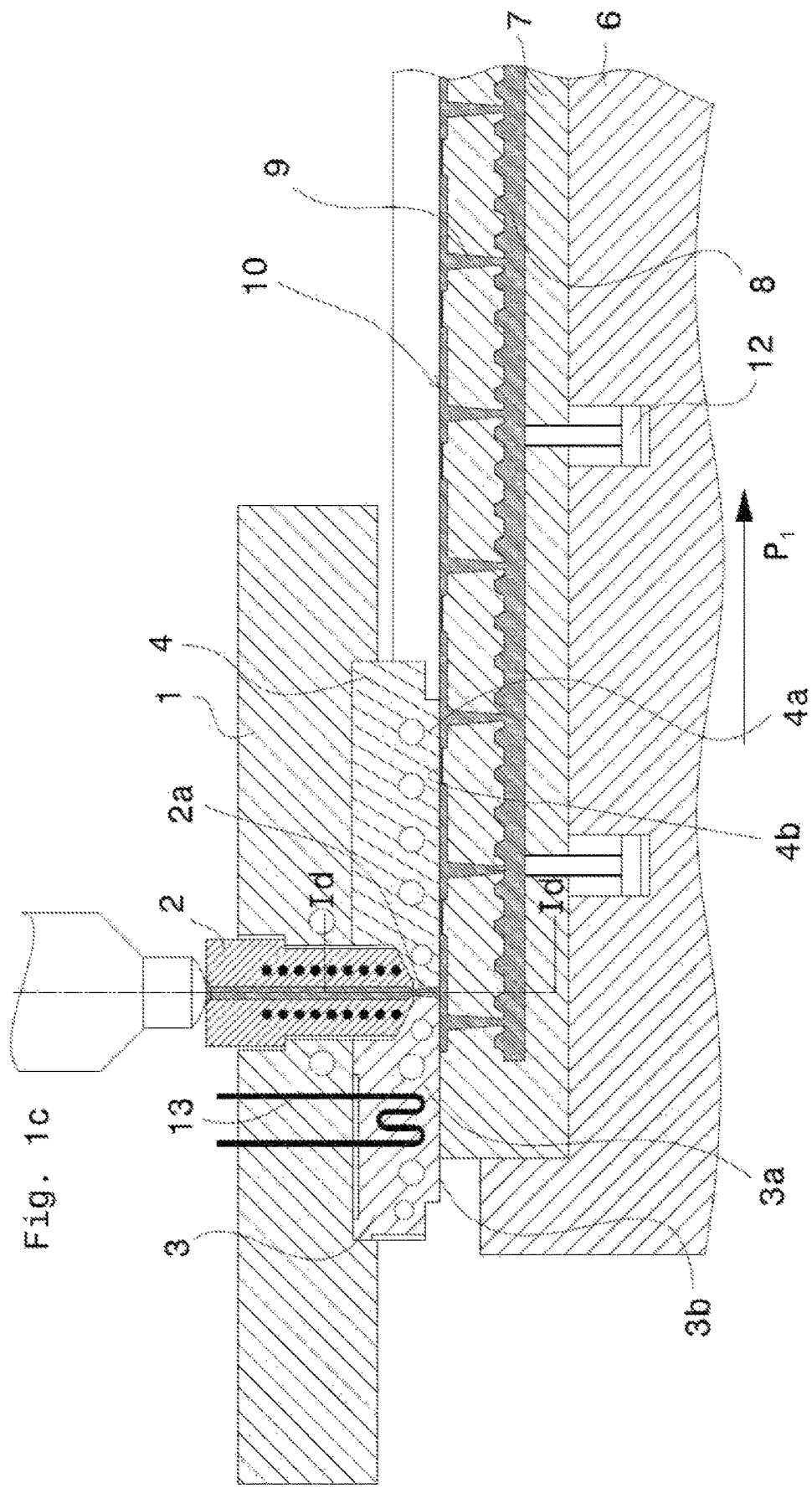

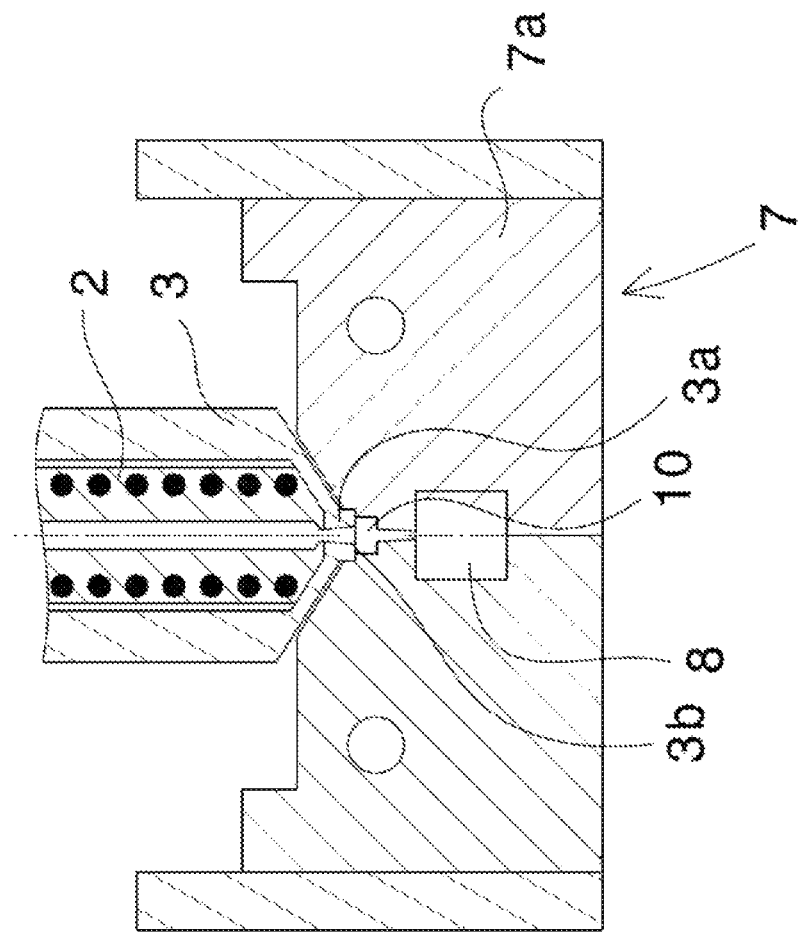

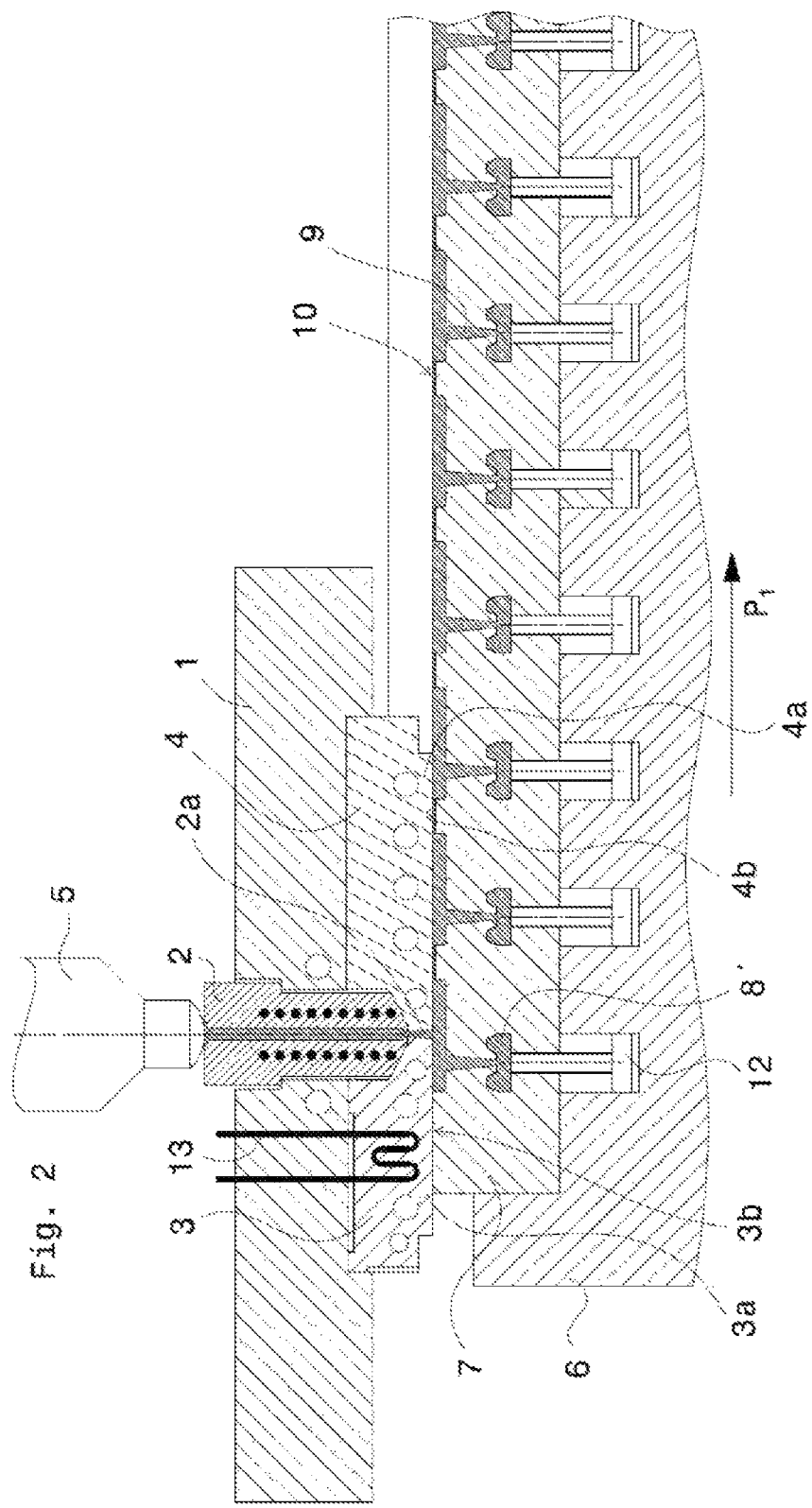

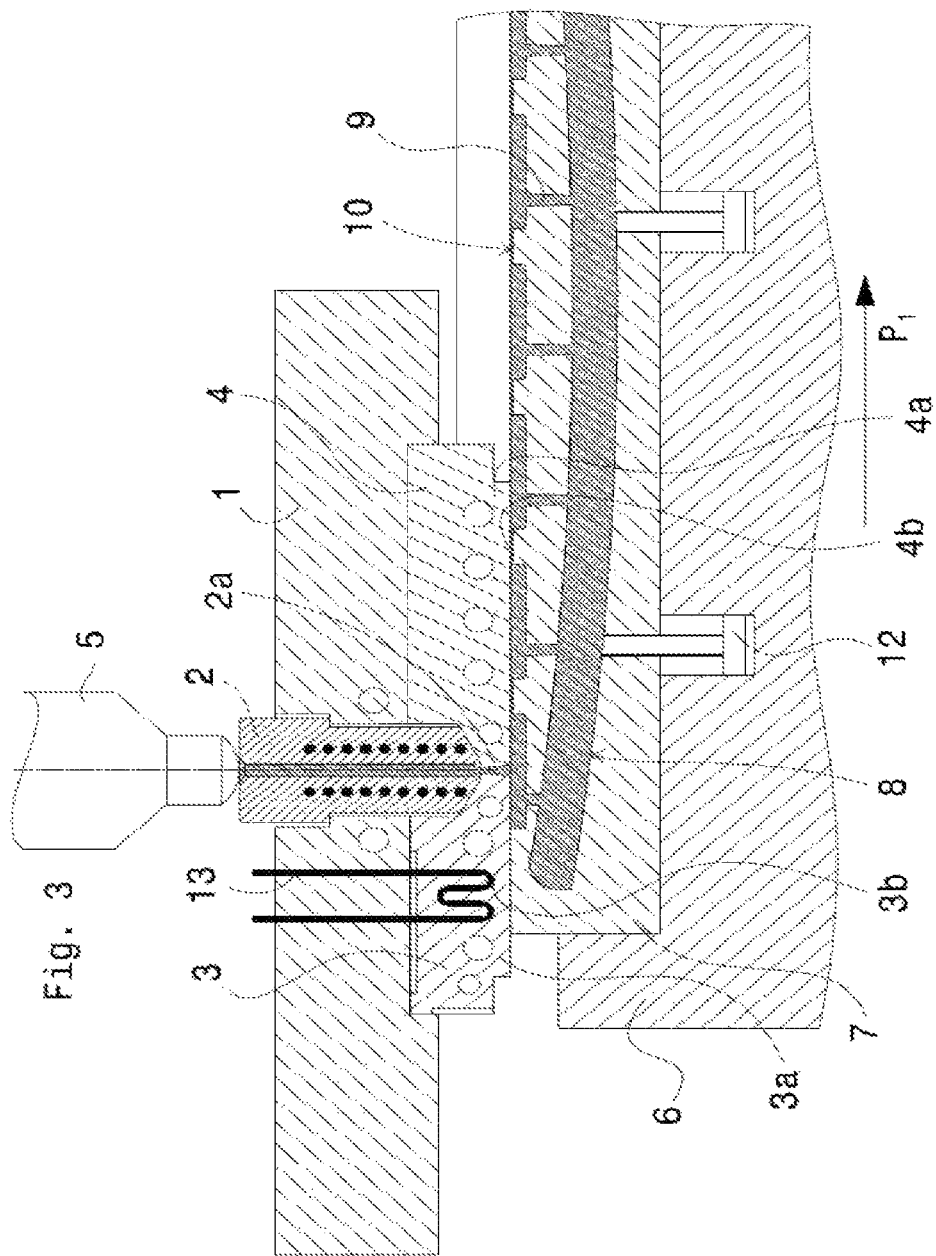

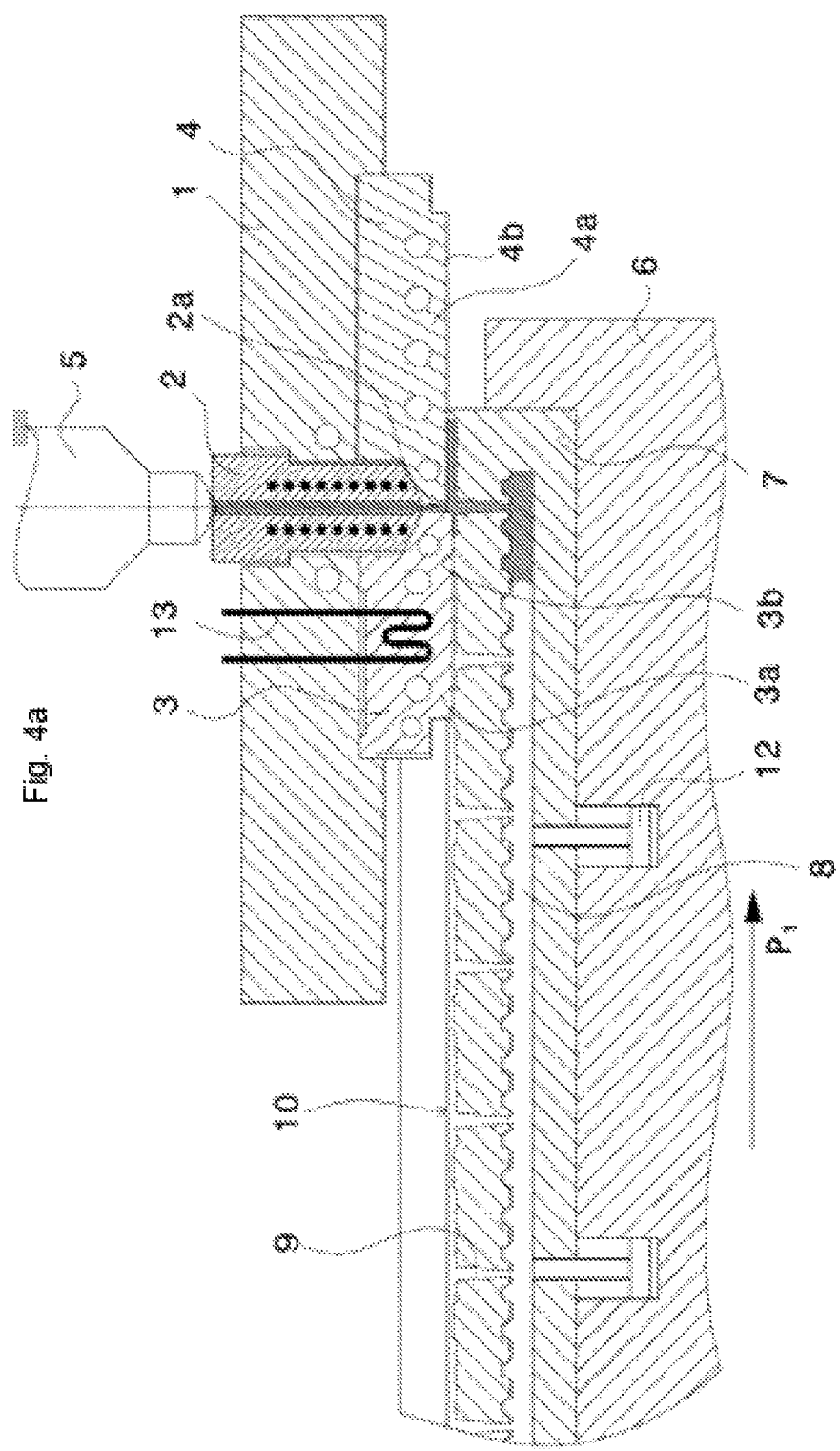

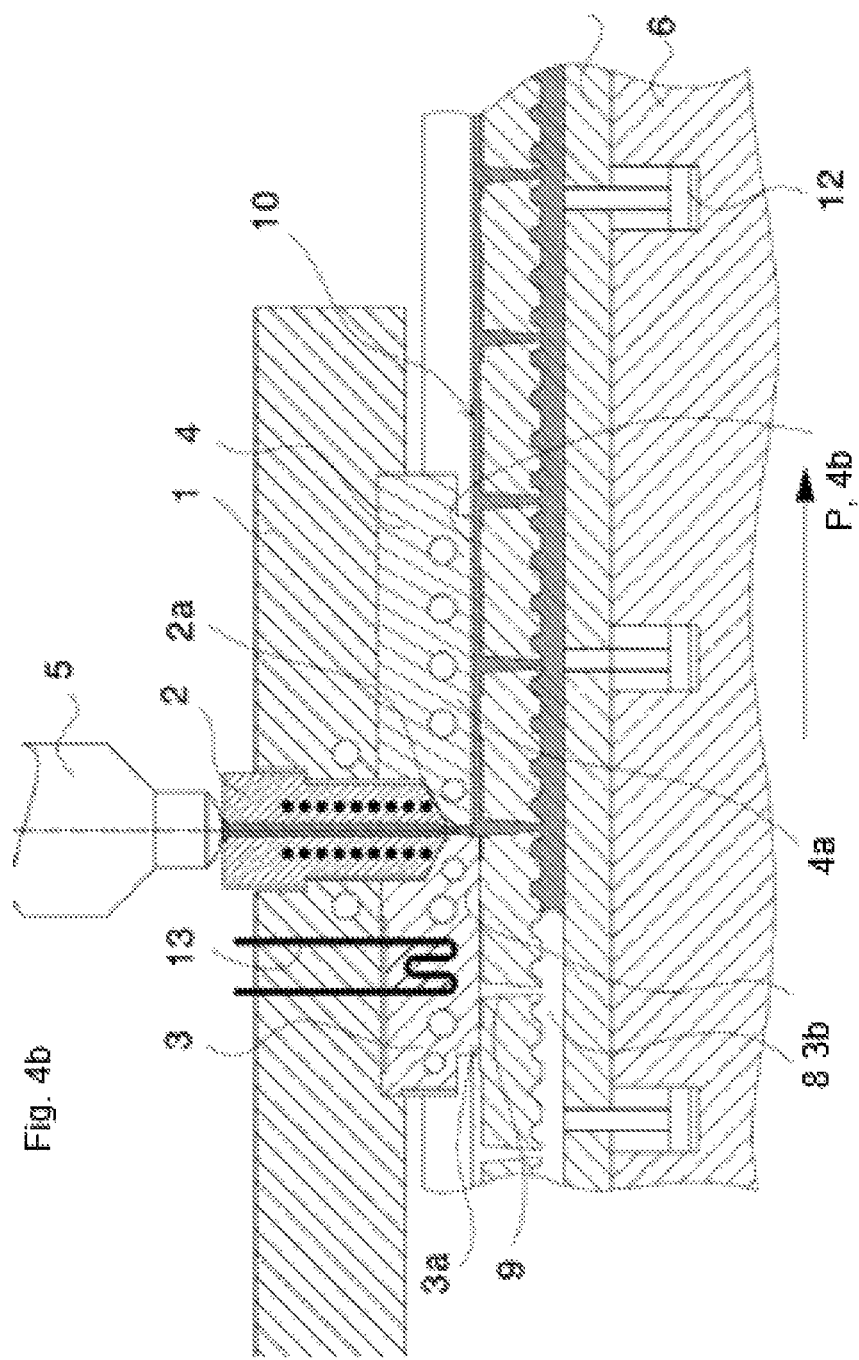

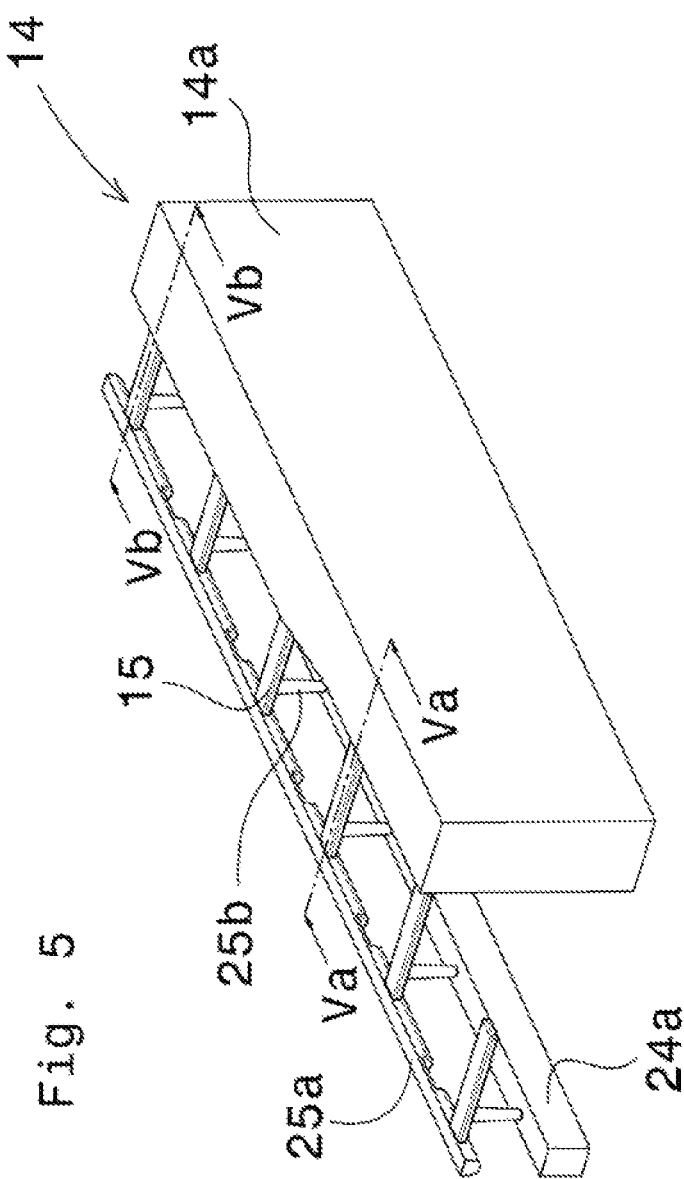
Fig. 5
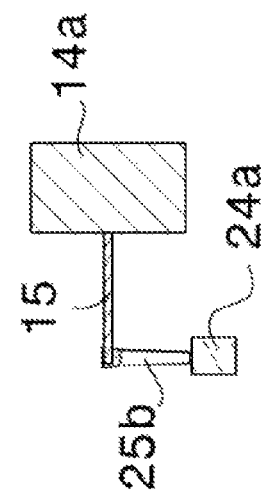
Fig. 5a Va-Va (Fig.5)
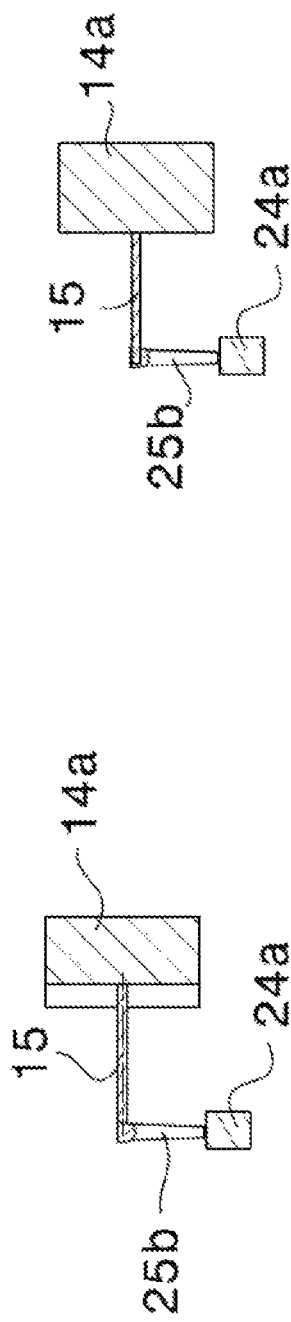
Fig. 5b Vb-Vb (Fig.5)

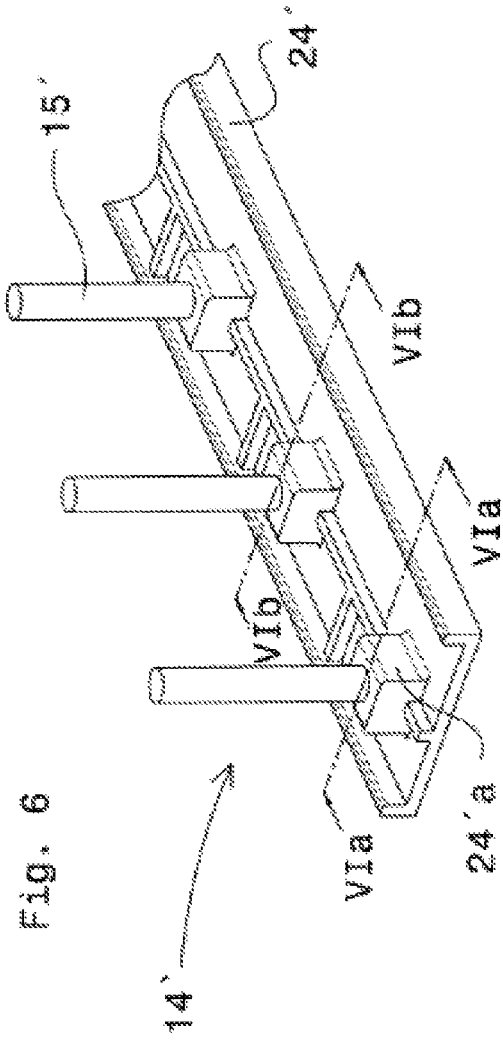
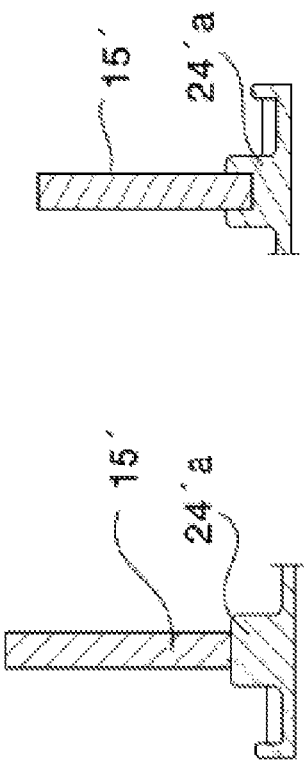
Fig. 6
Fig. 6a VIa-VIa (Fig. 6)  Fig. 6b VIb-VIb (Fig. 6)

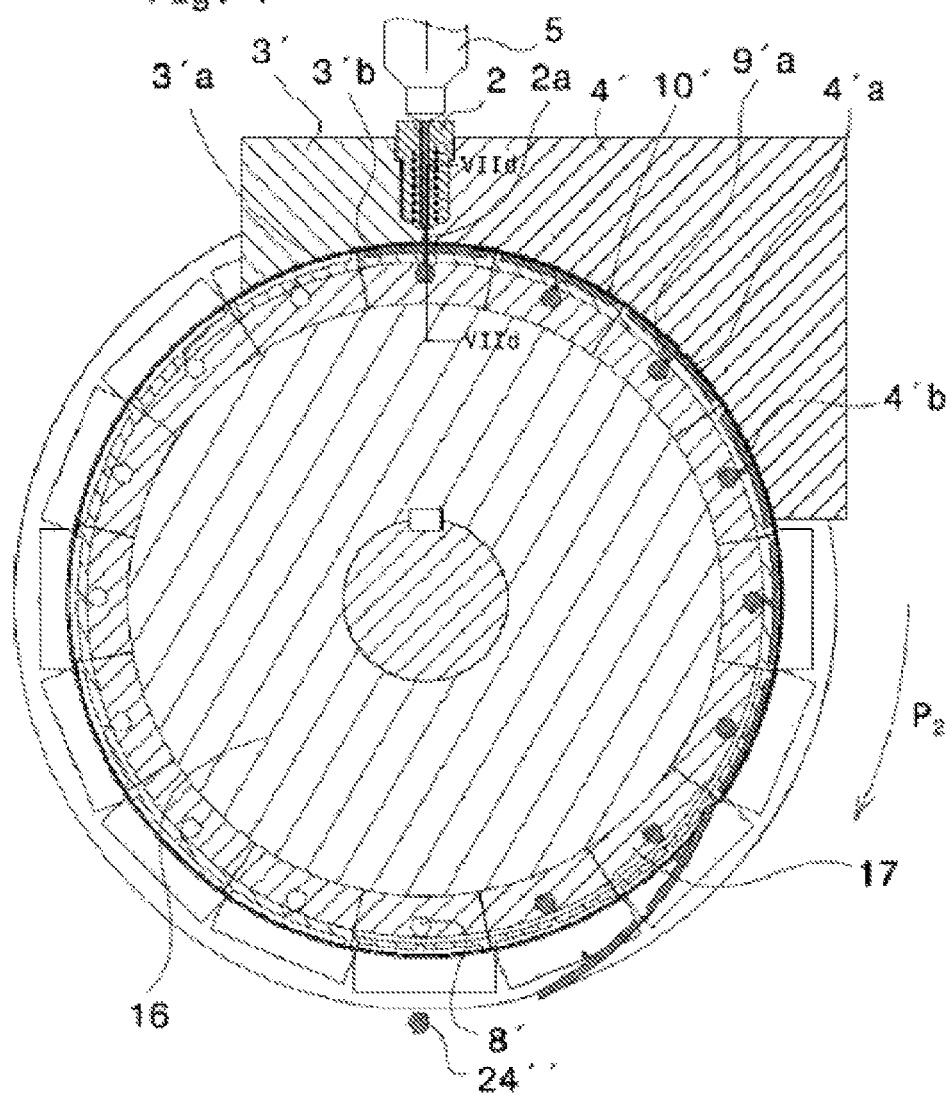

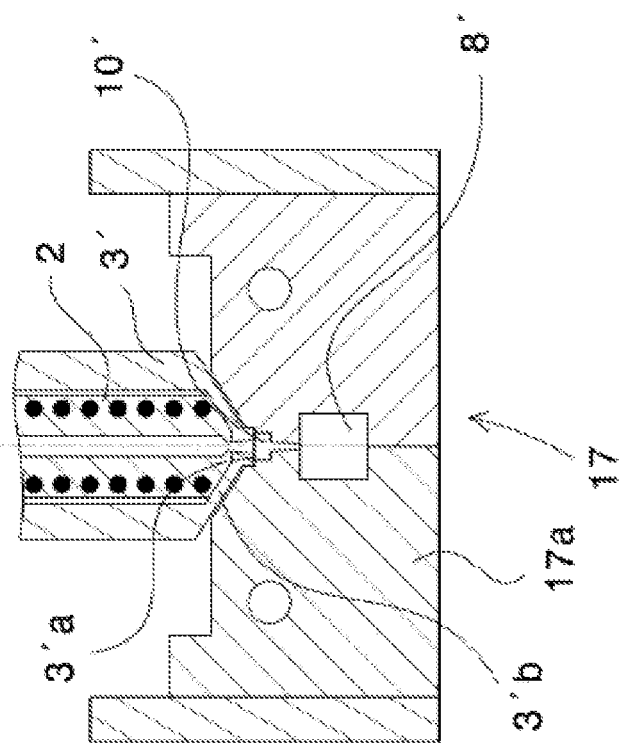

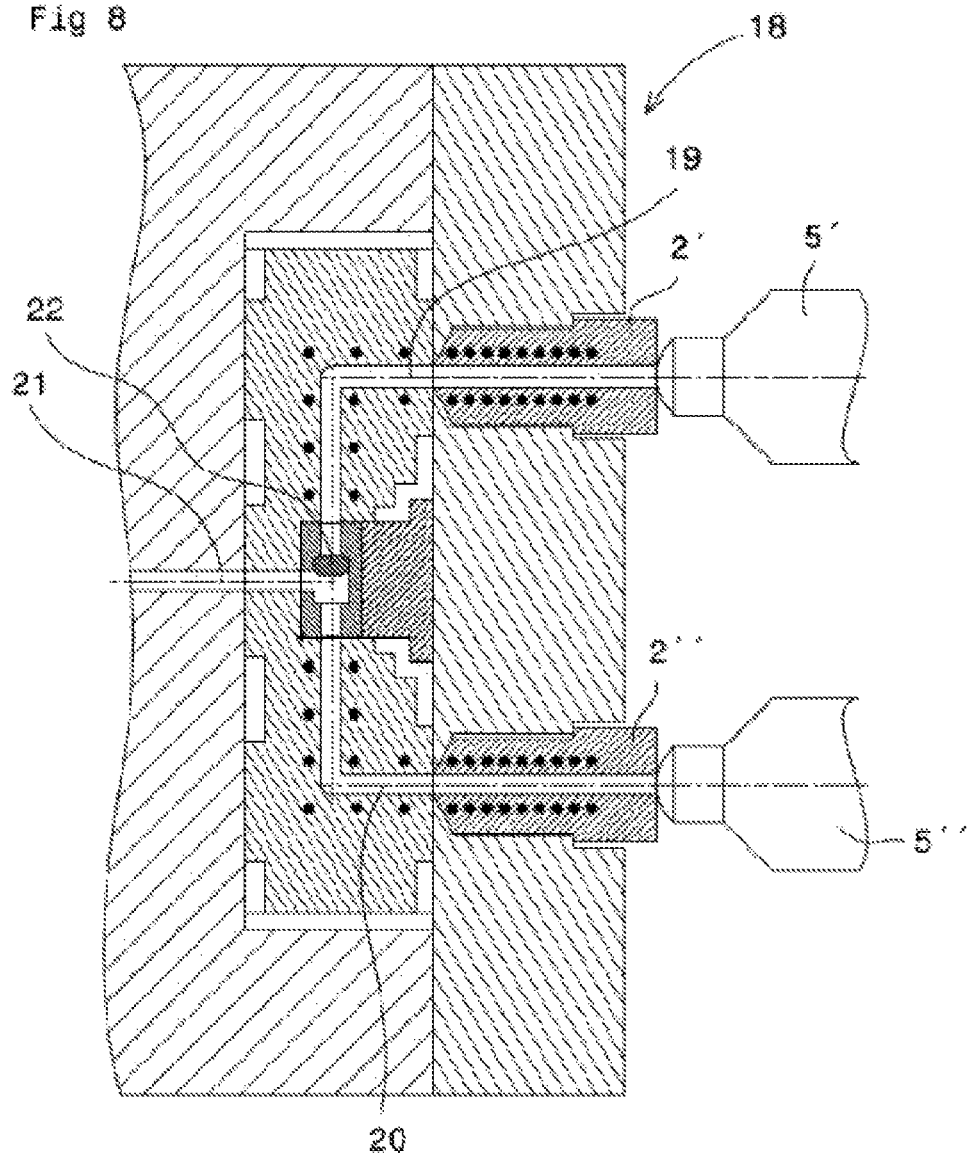

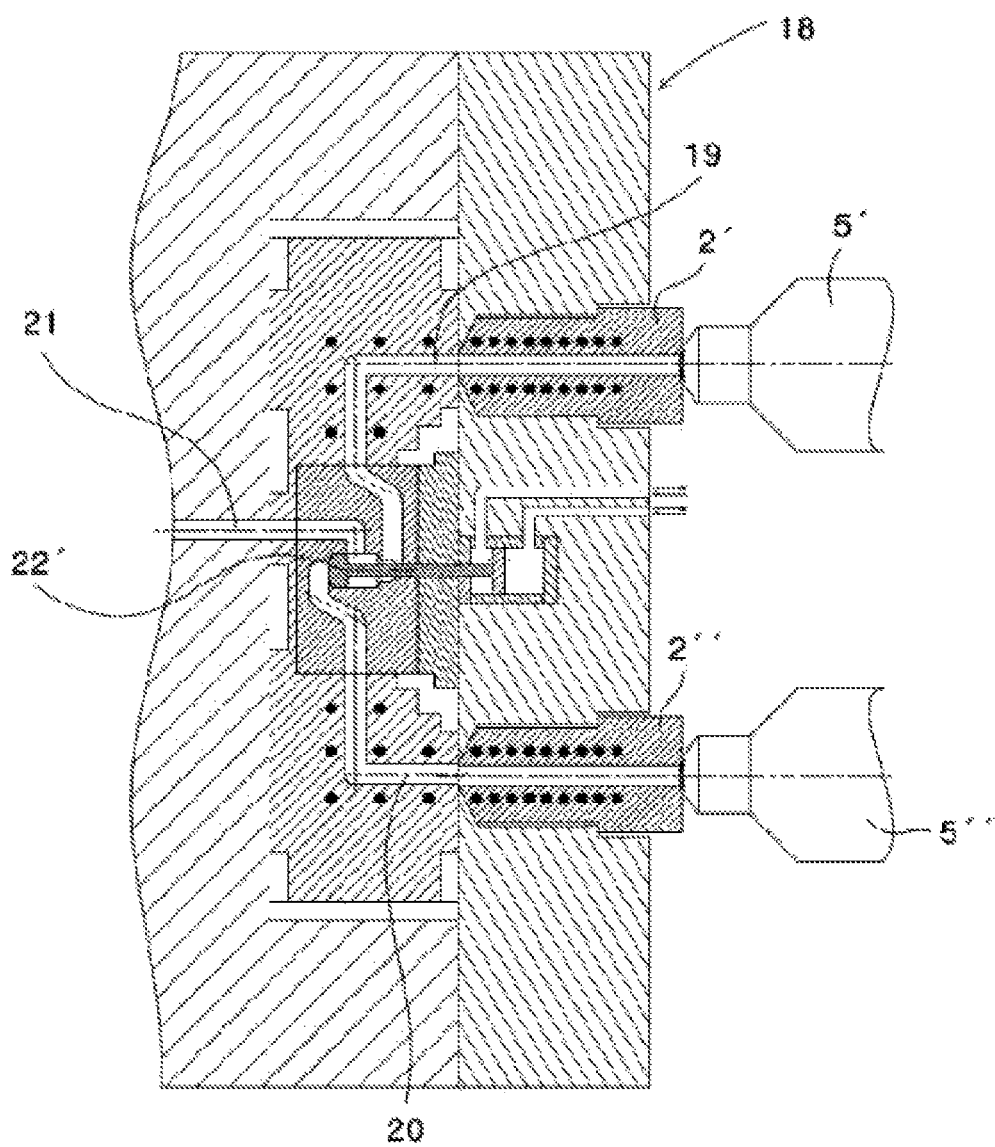

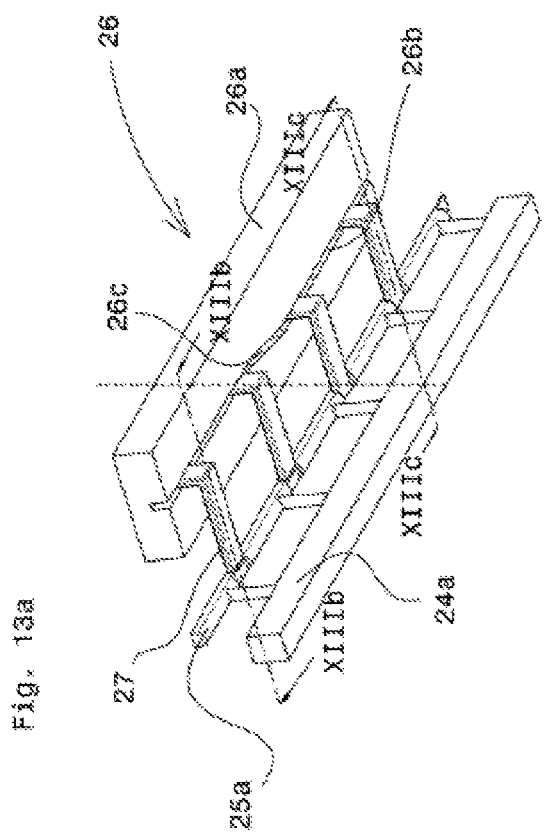
Fig. 13a
Fig. 13b XIIIb-XIIIb (Fig. 13a)
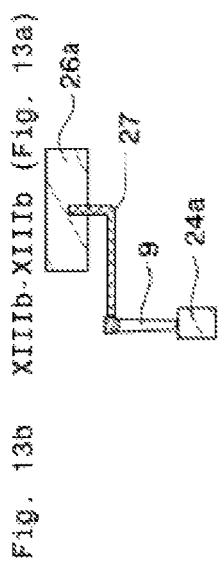
Fig. 13c XIIIc-XIIIc (Fig. 13a)

METHOD AND DEVICE FOR PRODUCING COMPONENTS OR PROFILES

The invention relates to a method for producing components or profiles from at least one solidifiable plastic compound in an injection moulding facility, said method comprising stationary mould components and mould components which are movable with respect thereto, wherein the movable mould components contain at least one mould cavity and the stationary mould components have at least one injection point, via which the solidifiable plastic compound is injected into the area between the stationary mould components and the mould cavity/ies in the movable mould components, while moving the movable mould components with the mould cavity/ies away from the injection point. The invention further relates to a device for producing components or profiles from at least one solidifiable plastic compound in an injection moulding facility, said device comprising stationary mould components and mould components which are movable with respect thereto containing at least one mould cavity, wherein the stationary mould components have a heatable leading part and a coolable trailing part and have at least one injection point in the region of the leading part and/or the trailing part.

Such a method and such a device are known from EP 2 205 420 B1, for example. This method, known as EXJECTION®, is used to produce elongate profiles or strips from a solidifiable plastic compound in a mould having a lower and an upper mould part while injecting the plastic mass into a cavity in a profiled mould insert which is located on a linearly movable carriage. In this case, the injected plastic mass is transported, with progression and continuous extension of the profile formed or the strip formed and with progressive solidification of the plastic mass, by moving the slide away from the injection point out of the mould. The plastic mass is injected until the profile or the bar has reached its intended length. The profiled mould insert, together with the upper mould parts or mould inserts comprising the casting insert, forms closed cavity portions only at the beginning and at the end of the injection process. During the movement of the profiled mould insert, the plastic mass, after filling the first end portion of the mould cavity, remains positioned with a free front portion relative to the upper mould part, wherein the mould cavity is further filled in the mould insert. This known method thus involves a combination of an injection moulding process and an extrusion process for producing elongate plastic finished parts, in particular made of thermoplastic materials. Since the component is formed directly from upper stationary mould inserts during the linear movement of the carriage, the production of a qualitatively satisfactory surface in this area requires a particularly careful and delicate coordination of the parameters of the injection process. However, these surface areas differ optically from the surface of the component formed in the cavity.

From DE 10 2015 003 206 A1, a method and a device for producing tapes from thermoplastics and continuous fibres by means of the EXJECTION® technology are known. A nozzle is provided therein, with which two injection units are associated, wherein pourable polymer material is conveyed by two injection units alternately to the nozzle and from the nozzle to transported fibres through an impregnating device. In this case, a matrix is formed from the pourable polymer material into which the fibres are embedded.

From WO 2016/097012 A1 a method and a device for producing an electrical line with a line core and with an outer casing surrounding it are known. In a continuous shaping method, individual casing portions of the outer casing are successively formed by surrounding the line core with a solidifiable plastic compound by means of a tool mould. The outer casing is formed in at least one partial portion with a cross-sectional geometry which is variable in the longitudinal direction.

EP 2 746 026 A2 addresses a method and a device for producing plastic preforms from a thermoplastic material, wherein the molten thermoplastic material is introduced continuously under pressure into a hot channel of a hot channel mould. A transport device having multiple cavities and having a surface which has openings of the cavities is guided over a surface of the hot channel mould, wherein at least one opening of a cavity is always positioned above the hot channel.

EP 2 712 721 A1 addresses a method for producing hollow bodies, in particular catheters, wherein this method is likewise based on the EXJECTION® technology.

The object of the invention is to further develop and further improved the method and device of the abovementioned type, in particular to be able to produce thick-walled components and components with complex geometry—both elongate profiles and items in larger numbers—to a high-quality and with a uniform surface quality in an economic, cost-effective manner. The method and the device should also allow for a large degree of freedom with respect to the design of the component geometries.

The object is achieved according to the invention by a method having the following steps:
a) injection of solidifiable plastic compound into a channel formed in the movable mould components and, from there, via connections
b1) either in portions into an individual mould cavity
b2) or one after the other into individual mould cavities,
c) wherein the channel in the region of the injection point, as well as in a leading zone located on the one side of the injection point in a direction counter to that of the movement of the moving mould components and in a trailing zone located on the other side of the injection point in the direction of movement of the moving mould components, is enclosed by at least one stationary, temperature-controlled mould component,
d) wherein in the channel, a continuous channel compound strand is formed with attachment compound strands, which is transported away from the injection point with increasing cooling and solidification and increasing length, together with the filled mould cavities and mould cavity portions,
e) wherein the channel compound strand, together with the connection compound strands, after its solidification and after opening the mould cavity or the mould cavities, is separated from the component(s), and
f) the component or the components is/are ejected.

The device according to the invention is characterised in that the movable mould components either contain an elongate mould cavity or individual cavities arranged in a row and have a channel designed as a recess, which is connected via connections either to the elongate mould cavity or to the individual cavities, wherein the channel is enclosed by the leading part and the trailing part in the closed mould in the region of the leading part and the trailing part.

By means of injecting the plasticised mass into a channel, the invention opens up the possibility of filling both individual cavities and cavity portions of elongate cavities via the connections. As a result, even components with complex geometry can be formed with high quality. The cavities, which are confined to the local attachment points of the connections, enable components to be manufactured with a uniform, flawless surface. The method according to the invention therefore has the advantages of the EXJECTION® technology known from the prior art without being associated with its disadvantages.

In a preferred embodiment of the invention, the method is a discontinuous method in which the movable mould components are moved linearly. A discontinuous method allows the production of components of finite length or of individual components limited in number by the number of individual mould cavities.

An alternative embodiment of the method according to the invention as a continuous method, in which movable mould components are continuously joined together, are filled, the component(s) is/are removed from the mould, and the mould components are recycled for refilling at the injection point, is particularly advantageous. A continuous method, in which the movable mould components are moved along a closed circle, is particularly preferred. These variants facilitate the production of an "endless" profile or the production of a large number of individual components, wherein this number is not limited by the number of mould cavities. A continuous manufacturing method is terminated when the profile has reached the desired length or when the desired number of individual components has been achieved.

In order to keep the injected solidifiable plastic compound in the plastic state in the region in which filling of the mould cavity/ies is primarily carried out via the connections in the channel, it is advantageous if the mould component surrounding the leading zone or forming the leading zone is heated as a moulding mass in the case of thermoplastics, or is cooled as a moulding mass in the case of thermosetting plastics or elastomers.

In the trailing zone, immediately on the other side of the injection point, it is advantageous in the case of thermoplastics for the plastic mass to be cooled as a moulding mass in the channel, the connections and the mould cavity/ies, to support the solidification process, and in the case of thermosetting plastics or elastomers initially to be heated as a moulding mass to achieve a chemical crosslinking of the mass. The mould component surrounding the channel in the trailing zone is therefore either cooled or heated.

In the preferred embodiment of the discontinuous method, the solidifiable plastic compound fills an elongate mould cavity in portions or individual mould cavities running in a row via the connections, which are formed in at least one mould insert, which is arranged on a linearly movable carriage.

In the discontinuous method, after filling the mould cavity or all mould cavities, the movable mould components are stopped, the supply of plastic material is stopped and steps e) and f) of claim 1 follow.

In the continuous method according to the invention, it is particularly advantageous if the solidifiable plastic compound partially fills a circular circumferential mould cavity in portions or individual mould cavities successively arranged in a circle via the connections, wherein the mould cavity or the individual mould cavities is or are provided within mould inserts which follow the circular outer circumference of a rotary unit following the circular shape directly following one another.

The continuous method according to the invention facilitates a particularly significant productivity increase. In this context, it is particularly advantageous that in step e) the solidified channel compound strand and the solidified connection compound strands are continuously separated after the emergence of the mould inserts from the trailing zone by means of successively opening of the mould inserts. It is further particularly advantageous that, following step e), the mould inserts are successively opened completely, either the component formed in the respective cavity is ejected or the component continuously formed in the mould cavity extending in a circle is partially removed from the mould, wherein the mould inserts are then closed in sequence and, during the continuous rotation of the rotary unit, successively enter the leading zone again.

In a preferred embodiment of a device according to the invention, which allows the production of components according to the discontinuous method, the device has a linearly movable carriage as a movable mould component which is provided with at least one mould insert containing the elongate mould cavity or the individual mould cavities, over the extension of which the channel is formed as a straight recess in the mould insert.

The elongate mould cavity in the mould insert may be straight for the production of straight profiles; however, it may also be overall curved arcuately and thus allow the production of slightly arcuately curved components.

In a preferred embodiment of a device according to the invention, which facilitates a continuous production of components, the device has a rotary unit with a circular outer circumference as a movable mould component, on which the mould inserts immediately following the circular shape are arranged, which respectively contain either a mould cavity or together contain an individual mould cavity following a circular shape, wherein the channel extends as a circular circumferential recess over all mould inserts.

Both in the variant with a carriage and in that with a rotary unit, the leading part and the trailing part have free edge portions facing the mould insert or the mould inserts with edge surfaces which, when the mould is closed, tightly cover the channel. Thus, in those areas of the mould in which the solidifiable plastic compound is injected, it is ensured that the cavity or cavities are filled with solidifiable plastic compound via the channel and the connections and that the trailing part either cools or heats the solidifiable plastic compound in the channel as well as in the connections and in the cavity/ies, depending on whether the mass is a thermoplastic or an elastomer or thermosetting plastic.

In a further advantageous embodiment of the invention, the leading part is offset or placed lower relative to the trailing part so that the channel gap in the region below the leading part is thinner walled than in the region below the trailing part. The pressure of the injected mass can thereby be maintained longer in the already filled portions of the mould cavity.

In a further preferred embodiment of the invention, the device has an embossing device with embossing stamps, which can be inserted locally in the channel in the region of the connections. The embossing stamps therefore provide pressure on the mass in the connections, specifically for an increase in the pressure in the cavity after filling. In this way, particularly thick-walled regions of the cavity can be optimally filled with solidifiable plastic compound.

In a further variant of the invention, the embossing device has embossing stamps which can be inserted into the cavity or the cavities. This measure makes it possible to locally strengthen the solidifiable plastic compound during cooling, in particular in those areas in which voluminous elements of the component are formed, so that the volume shrinkage is correspondingly reduced.

Actuation of the embossing device by means an embossing strip which is arranged on a stationary mould component is particularly advantageous, wherein the embossing stamps are positioned in a movable mould component in such a way that, during the movement of this mould component, they can be successively brought into their embossing position.

In a further advantageous embodiment of the device according to the invention, a flow brake device with a stationary actuating strip arranged on a stationary mould component, and with sliders mounted in a movable mould component, which are moved in the region of the leading part successively from the channel as soon as a portion of the channel has passed the nozzle in the direction of the trailing part, is provided. As a result, the mass in the cavity is better supplied with pressure after the respective portion of the channel has passed under the nozzle.

In particular, in a device according to the invention with a rotary unit, i.e. when performing the continuous method, it is advantageous if two injection units are used to ensure a constant supply of the channel and the cavities with solidifiable mass. A correspondingly designed device therefore has two injection units and a channel block with two nozzles which can be supplied with solidifiable plastic compound by the injection units, wherein a channel extends from each nozzle into the centre of the respective channel block. Here, in one embodiment of the invention, one of the two channels can now be alternately connected, via a change-over valve, to a further channel, which runs to the injection point in the region of the leading and trailing parts. In an alternative embodiment, in the centre of the channel block via needle valve nozzles, the two channels can be connected simultaneously or alternately with another channel, which extends to the injection point in the region of the leading and trailing parts. Above all, this embodiment variant makes it possible to ensure a constant pressure of the solidifiable plastic compound via a corresponding actuation of the needle valve nozzles when changing the injection units.

Another advantageous embodiment of the invention facilitates the production of components from two different solidifiable plastic compounds in a two-component method. In this device, two nozzles are provided, which are both positioned in the leading part or are a component of a unit of the injection moulding machine, wherein each nozzle can be supplied with a correspondingly composed separate solidifiable plastic compound.

Further features, advantages, and details of the invention will now be described in greater detail with reference to the drawing, which schematically depicts multiple exemplary embodiments.

Figure 11:
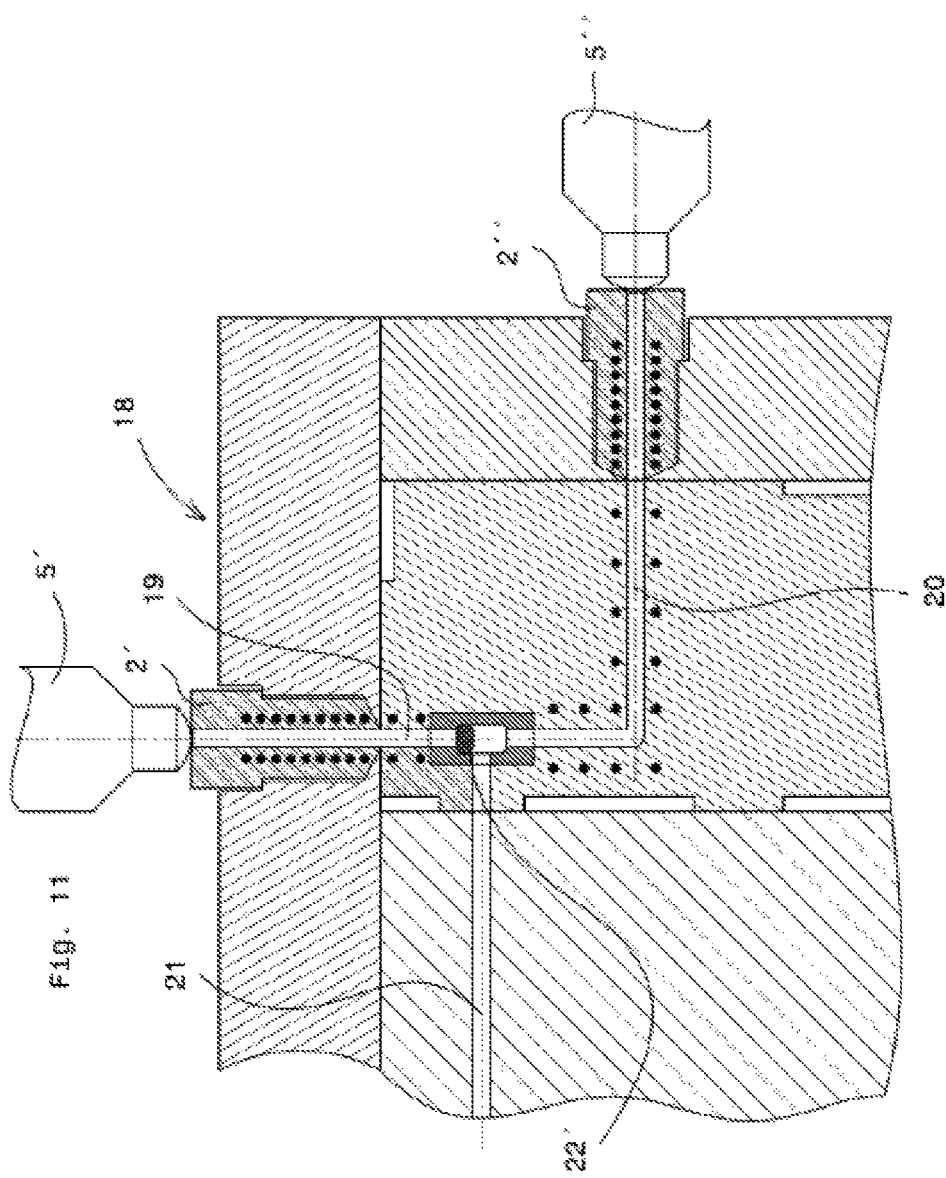
Figure 12:
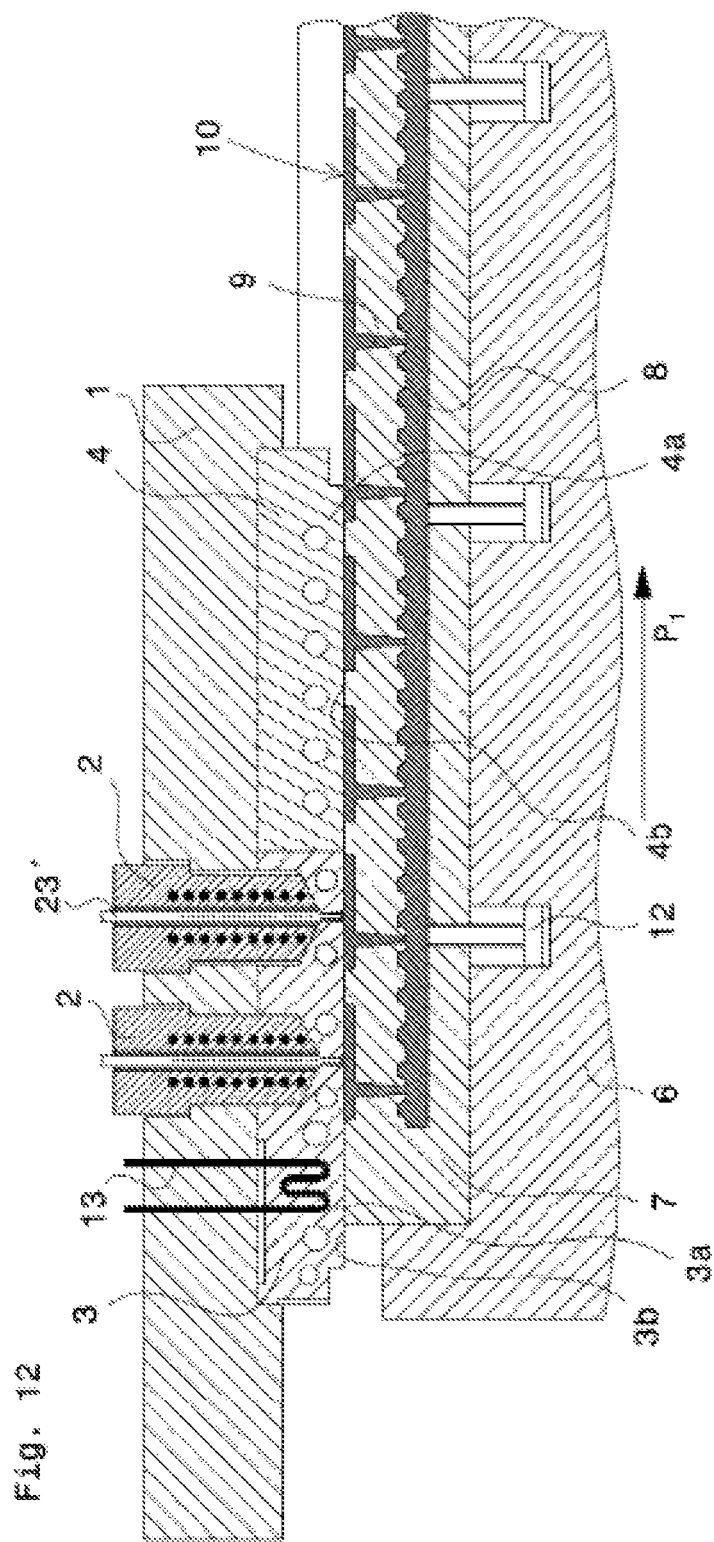
Figure 13:
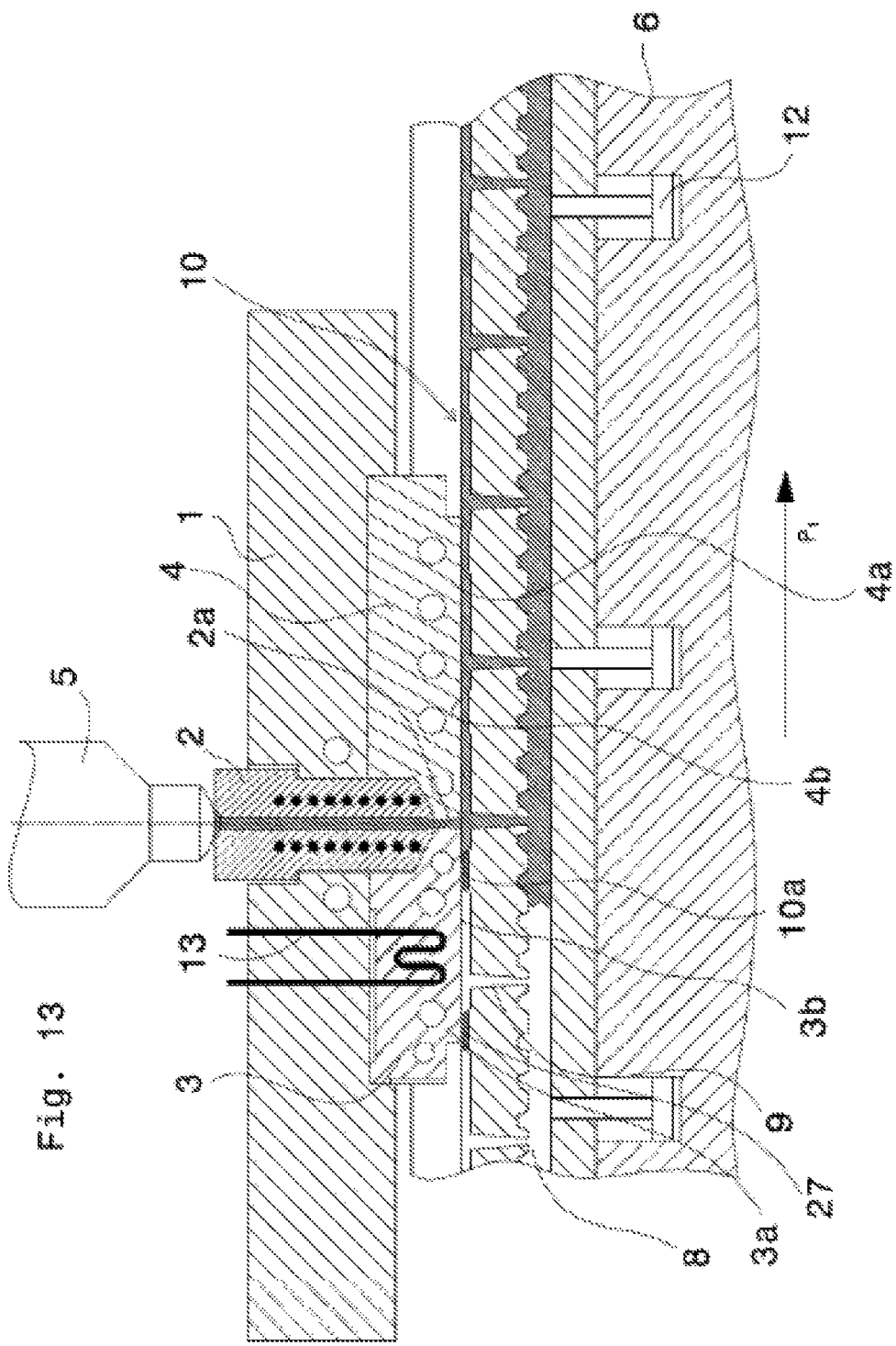

In the figures:

FIGS. 1a to 1c show views of an embodiment of a device according to the invention in different stages of the method, FIG. 1d shows a cross-sectional view in the region of a nozzle, FIG. 2 shows a second embodiment of the device according to the invention in a representation analogous to FIG. 1c, FIG. 3 shows a third embodiment of the device according to the invention in a representation analogous to FIG. 1c, FIGS. 4a to 4c show a fourth embodiment in representations analogous to FIGS. 1a to 1c, FIGS. 5, 5a and 5b show views of a embodiment variant of an embossing device, FIGS. 6, 6a and 6b show views of another embodiment of an embossing device, FIG. 7 show a view of another embodiment variant of a device according to the invention in a cross-sectional view, FIG. 7a shows a sectional view along the line VIIa-VIIa of FIG. 7, FIGS. 8, 9, 10 and 11 show views of embodiments with two injection units in sectional views, FIG. 12 shows a view of a further embodiment variant of a device according to the invention with two nozzles in a representation analogous to FIG. 1c, FIG. 13 shows a view of a further embodiment variant of a device according to the invention in a representation analogous to FIG. 11, and FIGS. 13a to 13c show views of an embodiment variant of a flow brake device.

In all figures of an injection moulding machine, only those components are shown that are directly or indirectly involved in the moulding of the components to be produced. Location designations in the following description, such as above, below, left, right, and the like, refer to the illustrations in the figures.

The embodiment variants of the invention shown in FIGS. 1a to 1c, 2, 3, 4a to 4c, 12 and 13 are embodiment variants for producing one or more components in a discontinuous method. In these embodiment variants of the invention, two mould parts are provided, which can move towards and away from one another for opening and closing. Not shown in this manner, an attached mould insert 1 includes one upper mould part, through which a nozzle 2 having a nozzle hole 2a leading away from the injection unit 5 (merely indicated in the Figures) extends, through which plasticised mass exits under pressure during operation of the injection moulding machine. In the mould insert 1, a leading part 3 forming a leading zone and a trailing part 4 forming a trailing zone are inserted, wherein in the variants shown in the figures, the nozzle 2 is positioned between the leading part 3 and the trailing part. Both the leading part 3 and the trailing part 4 are in particular made of several parts and provided in a known manner with channels for passing a tempering medium. Heating elements 13 for obtaining the injected mass in the melted state are also found in the leading part 3 if a thermoplastic mass is involved. In an alternative embodiment of the invention, the nozzle extends through the leading part, and the trailing part closes directly after the nozzle.

On the second lower mould part, an elongate carriage 6 is arranged to be linearly displaceable in the direction of the arrow P1 in the figures and in the direction of its longitudinal extension. A mould insert 7 is positioned in the longitudinal extension of the carriage 6, which in the embodiments shown in FIGS. 1a to 1c, 3, 4a to 4c and 12, contains a single, elongate mould cavity 8, and in the embodiment shown in FIG. 2, contains a plurality of mould cavities 8' successively arranged in a row. The mould cavity 8 is designed, for example, such that an elongate component, for example a strip or a profile, is produced therein. The mould cavities 8' are intended, for example, to produce a large number of identical individual parts. The mould cavity 8 is connected, in particular regular intervals, via connections 9, to a channel 10 on the top of the mould insert 7, and each mould cavity 8' is in particular connected to a channel 10 with a connection 9—a distribution channel. The channel 10 is a recess extending substantially over the longitudinal extension of the mould cavity 8 or over the extension of the row of mould cavities 8' in the mould insert 7. In the embodiments shown, between the connections 9, the channel 10 has narrowed or shallow portions 10a, and recessed portions 10b at the mouth regions of the connections 9. In all portions 10a, 10b, the channel 10 preferably has a constant width over its longitudinal extension, which is adapted to the flowability of the solidifiable plastic compound and the respective geometry of the mould cavity 8 or the mould cavities 8', and measures a few millimetres. In the embodiment shown, the nozzle hole 2a of the nozzle 2, has a diameter which is smaller than the width of the channel 10.

As the sectional view in FIG. 1d shows, the mould insert 7 has multiple, for example two, jaws 7a, which enclose the mould cavity 8 where there are multiple cavities 8', the connections 9 and the channel 10, are braced against each other, and can be moved away from one another to open the cavity 8 and cavities 8'. In the embodiment shown, above the channel 10, the jaws 7a form a V-shaped recess in cross-section into which, in the closed position of the mould, lower edge portions 3a, 4a of the leading part 3 and the trailing part 4 engage, the edge portions designed mirror-inverted in cross-section, therefore preferably V-shaped, and extending linearly in the longitudinal direction of the carriage. Narrow edge surfaces 3b, 4b on the edge portions 3a, 4a of the leading part 3 and the trailing part 4 close the channel 10 from above in those areas where the leading part 3 and the trailing part 4 are respectively located during the injection process of the solidifiable plastic compound and the linear movement of the carriage 6.

By means of a number of ejectors 12, the manufactured component or the manufactured components are removed from the mould with the jaws 7a open. In one embodiment with a number of mould cavities 8', at least one ejector 12 is provided per mould cavity 8'.

For linear movement of the carriage 6 in the direction of the arrow P1, at least one drive, not shown, in particular a linear drive, is provided, which is operated in a known manner, for example electrically, mechanically, pneumatically, or hydraulically.

FIG. 3 shows an embodiment in which a component is produced, which is overall slightly arcuately curved. By means of a corresponding configuration of the jaws, an overall curved cavity 8 with connections 9 corresponding to varying lengths is provided in the mould insert 7. Otherwise, this embodiment corresponds to that according to FIGS. 1a to 1c.

The embodiment shown in FIGS. 4a to 4c largely corresponds to that of FIGS. 1a to 1c, but has a special feature compared to the leading part 3 offset or positioned lower relative to the trailing part 4, so that the channel gap in the region below the leading part 3 is thinner walled than in the region below the trailing part. 4 The pressure of the injected mass can thereby be maintained longer in the already filled portions of the mould cavity 8 than in other variants.

The basic mode of operation of the devices according to the invention according to FIGS. 1a to 1c, 2, 3, 4a to 4c and FIG. 12 and the basic sequence of the discontinuous method will now be described with reference to FIGS. 1a to 1c and FIGS. 4a to 4c.

The mould is closed, the closing force is applied, and the carriage 6 moved to its starting position. At the beginning of the injection process, in FIG. 1a and FIG. 4a, the carriage 6, together with the mould insert 7, is therefore in its starting position, in which the nozzle 2 is located at the front end, here the right end, of the mould cavity 8 and therefore also at the front end of the channel 10. Now the solidifiable plastic compound is injected via the nozzle 2 under high pressure and the carriage 6 is set in motion, wherein the front end portion of the mould cavity 8 is initially filled via the channel 10 and the first connection 9. The solidifiable plastic compound, which penetrates slightly within the channel 10 below the leading part 3, forms a free mass front below the leading part 3, in FIGS. 1b and 4b, which is essentially maintained during the movement of the carriage 6 in the direction of the arrow P1. During the movement of the carriage 6, the mould cavity 8 is successively filled with the solidifiable plastic compound via the connections 9. The channel 10 therefore ensures a successive filling of the mould cavity 8 with solidifiable plastic compound and for a corresponding holding pressure phase. The thin-walled portions 10a act as "flow brakes", causing an increase in pressure, so that the solidifiable plastic compound passes under suitable pressure in the connections 9. In the case of thermoplastic masses, the trailing part 4 supplied with coolant cools both the mass strands located in the channel 10 and in the connections 9; in masses of elastomers or thermosetting plastics, the trailing part is heated in order to achieve chemical crosslinking of the plastic. As the carriage 6 advances, the channel 10 emerges from the trailing part 4, which solidifies the mass strands found in the channel 10 and in the connections 9. As soon as the mould cavity 8 is completely filled (FIG. 1c, FIG. 4c) or the individual cavities 8' (FIG. 2) are filled with mass, the carriage 6 is stopped. Some force is still applied and then the supply of plastic mass is also stopped. After a cooling phase, the mould is opened, and the mould insert 7 is opened by moving apart the jaws 7a. The channel compound strand, together with the connecting strands, is now removed by separation before or after the ejection of the formed component or components.

FIG. 5, together with the sectional views in FIGS. 5a and 5b, illustrates the mode of operation of an embossing device 14, which acts locally on the solidifiable plastic compound in the channel 10 in the region of the connections 9. FIG. 5a is a section along the line Va-Va of FIG. 5; FIG. 5b is a section along the line Vb-Vb of FIG. 5. For the sake of clarity, the component 24a to be formed from the plastic mass, the mass channel compound strand 25a, and some connection compound strands 25b are shown. The embossing device 14 has an embossing strip 14a, which is positioned stationary, for example on the mould insert 1. The embossing device 14 also comprises one of the number of embossing stamps 15, corresponding to the number of connections 9. The embossing stamps 15 are positioned in a manner not shown in the carriage 6 so that, during the movement of the carriage 6 from the embossing strip 14a, they can be moved successively into their embossing position as soon as a cavity—in the case of individual cavities—or a cavity portion is filled with plastic mass. The mutual distance of the embossing stamps 15 corresponds to the mutual distance of the connections 9. The sectional view in FIG. 5a shows the position of an embossing stamp 15 in its unactuated position in the case of a connection compound strand 25b. FIG. 5b shows the position of an embossing stamp 15 in its embossing position, the embossing stamp 15 is retracted into the plastic mass in the channel 10 and facilitates an increase in the pressure in the cavity 8 after filling, in particular ensuring optimum filling of thicker-walled regions of the cavity 8.

Components of a further variant of an embossing device 14' and their mode of operation are shown in FIGS. 6, 6a and 6b. FIG. 6a is a section along the line VIa-VIa of FIG. 6; FIG. 6b is a section along the line VIb-VIb of FIG. 6. The arrangement of the embossing strip, not shown here, is the same as the embodiment already described, namely stationary. The embossing stamps 15' in this embodiment in particular are prepositioned within the mould insert 7 and one of the jaws 7a formed by the mould insert 7, for example horizontally oriented. In the embodiment shown, for example, a component 24' is produced which is composed of regular voluminous block-like elements 24'a. Each embossing stamp 15' is assigned to the region of the mould cavity 8 which in each case forms one of the voluminous, block-like elements 24'a of the component 24'. FIG. 6a shows the position of an embossing stamp 15' before embossing, FIG. 6b, during embossing. The embossing stamp 15' is pressed into the mass in the voluminous, block-like element 24'a. The voluminous elements of the component have a larger volume shrinkage than the thin-walled, rod-shaped portions; since they cool more slowly, a pressure supply of voluminous component elements on the thin-walled, rod-shaped portions would be very time-limited. The embossing stamps 15' ensure that the mass in the voluminous elements is locally more compacted during cooling, so that the volume shrinkage is correspondingly reduced.

The variant of the invention shown in FIGS. 7 and 7a is a variant for producing one or more components in a continuous method. FIG. 7 and FIG. 7a show an embodiment of the device according to the invention with a mould with a rotary unit, wherein FIG. 7a shows a sectional view along the line VIIa-VIIa of FIG. 7. The rotary unit has a carrier 16 displaceable in a continuous rotary motion by means of a drive unit, not shown, provided with a circular outer circumference, on the outer circumference of which a plurality of mould inserts 17 is arranged immediately adjacent to each other, so that all mould inserts 17 form a mould insert circle. When all the mould inserts 17 are closed, the support 16 extends circumferentially around all of the mould inserts 17 in a circular manner around a channel 10. At a part of the device stationary relative to the rotary unit, for example a channel block of the mould, not shown, at the top of the support 16 and the rotary unit, a leading part 3' and a trailing part 4' are also positioned stationary. Analogous to the embodiments already described, a nozzle 2 leading away from an injection unit 5 having the nozzle hole 2a is preferably located between the leading part 3' and the trailing part 4'. The leading part 3' and the trailing part 4' have arcuately extending lower edge portions 3'a, 4'a, formed concentric with the channel 10, the edge surfaces 3'b, 4'b of which, analogous to the embodiments already described, form an enclosed leading and trailing zone in the closed mould together with the channel 10'. As shown in FIG. 7a, the mould inserts 17 also comprise jaws 17a, which, in this embodiment, are designed according to the circumference of the rotary unit in order to, when all mould inserts 17 are closed, together form the circular encircling, as a channel 10' formed as a recess. The jaws 17a of each mould insert 17 contain, in the mutually braced position, at least one separate mould cavity 8' and in each case at least one connection 9' formed as a channel, which opens into the recess formed between the jaws 17a and forming a portion of the channel 10'.

FIG. 7a shows the rotary unit in the region of the nozzle 2, wherein the exemplary V-shaped edge portion 3'a of the leading part 3 and the channel 10' formed between the two jaws 17a can be seen.

To operate the device, the rotary unit is put into continuous and constant rotational movement by the drive. Analogous to the embodiments already described, a free mass front forms during injection of solidifiable plastic compound in the leading zone below the leading part 3' in the channel 10' while the individual cavities 8' are filled in succession via the channel 10' and the connections 9'. The filled cavities 8' are moved away from the nozzle 2 in the direction of rotation (arrow P2), wherein each mould insert 17 passes the trailing zone below the cooled (in the case of thermoplastics) or heated (in the case of elastomers or thermosetting plastics) trailing part 4' as the distance from the injection point continues. The plastic mass in the channel 10', in the connections 9' and in the respective cavity 8' begins to cool.

Finally, each mould insert 17 comes out of the trailing part 4' and the plastic mass cools down further and solidifies. In particular, after about a quarter to half of the circumference of the rotary unit, each mould insert 17 is automatically opened so that the mass strand in the channel 10 can be separated together with the connection strands. This process also takes place continuously from mould insert 17 to mould insert 17. The mould inserts 17 are then automatically opened one after another, and the component formed in the cavity 8' is automatically ejected. FIG. 7 shows an exemplary immediately ejected component 24". Subsequently, the mould inserts 17 are closed again automatically in sequence and, during the continuous rotation of the rotary unit, pass successively back into the leading zone below the leading part 3' and are again filled one after the other with plastic mass.

In an alternative variant, not separately shown, with a rotary unit of all mould inserts, a continuous circular encircling mould cavity is formed, so that an "endless" profile, in particular a deformable, windable profile, with varying cross-sectional design, can be produced.

In a further alternative variant, not shown separately, for the production of one or more components in a continuous method in a transport, individual mould inserts are filled continuously, for example, linearly, directly joined, as described, the components are removed from the moulds, the mould inserts are closed again and fed back to the injection point.

If, after ejection of the components, the mould inserts are replaced by differently shaped mould cavities having mould inserts and the components successively used again in these mould inserts, for example injecting a second mass component can be carried out via a second nozzle. Alternatively, a second rotary unit may be provided with corresponding mould inserts.

Analogous to the embodiment according to FIGS. 4a to 4c, a stepped leading part 3' can also be provided with a rotary unit in the embodiment.

The rotary unit is set in rotary motion in particular by an electric motor with or without gears, which is controlled by the control of the injection moulding machine or separately.

As the solidifiable plastic compound is continuously injected, filled cavities and manifold channel compound strands are moved away from the nozzle by the rotational movement of the rotary unit. These phases run spatially one after the other, but temporally simultaneously. This results in a significant increase in productivity compared to a conventional injection moulding process.

FIGS. 8 to 11 show variants of a continuous supply of a rotary unit with a solidifiable plastic compound. All of these figures show nozzles 2', 2" leading away from horizontally arranged injection units 5', 5" The nozzles 2', 2" are positioned in a channel block 18, which is designed according to the arrangement and guiding of channels 19, 20, 21 corresponding to several parts. From each nozzle 2', 2" a channel 19, 20 leads into the centre of the respective channel block 18. Here, a connection or a transition of these two channels 19, 20 is carried out in the channel 21, which opens into the nozzle 2 in the region of the leading and trailing part 3', 4'.

In the embodiment shown in FIG. 8, portions of the channels 19, 20 together with the channel 21 form a T-junction, at which a diverter valve 22 indicated in this figure ensures that the channel 21 is alternately supplied with melt from the injection unit 5' and from the injection unit 5". The diverter valve 22 is correspondingly controlled, for example via pressure differences in the injection units 5', 5". In the embodiment shown in FIG. 9, a diverter valve 22' is provided which is coupled to a piston rod and a piston, so that the actuation of the diverter valve 22' can be carried out hydraulically or pneumatically. Alternatively, the operation may be provided by means of an electric drive. In this embodiment, the switching or release of the channels 19, 20 is preferably ensured via a controller that takes into account the screw stroke in the units 5', 5". In the variant shown in FIG. 10, the mass flow to the channel 21 is regulated via needle valve nozzles 23. In this embodiment, the channel 21 can also be supplied with the mass from both channels 19, 20. This measure is particularly advantageous because in this way the pressure can be kept constant when changing between the injection units 5', 5". FIG. 11 shows an embodiment which corresponds in function to that of FIG. 8, wherein here the two nozzles 2', 2" are arranged at right angles to each other, the two channels 19, 20 run in L-shapes to each other, and the channel 21 branches off from one of these L portions. With the diverter valve 22, a T-junction is therefore formed again.

In the variants illustrated in FIGS. 8 to 11, the channel block 18 is preferably a component of the mould and not a component of the injection moulding machine. However, it is also possible to provide the channel block with a diverter unit as an independent assembly, which is constructed in front of the mould on a fixed spanning sheet of the injection moulding machine. This has the advantage that the same diverter unit of the channel block can be used for several moulds.

FIG. 12 shows, in an embodiment analogous to FIG. 1c, a variant of the invention in which components of two different solidifiable plastic compounds can be produced in a two-component method. Two nozzles 2 are provided, which are both positioned in the leading part 3. Otherwise, this embodiment corresponds to that shown in FIG. 1c. By means of the two nozzles 2, two differently composed plastic masses can thus be introduced into the cavity 8 via the channel 10, wherein it is possible for the masses to be injected either simultaneously or alternately. If the plastic mass is injected simultaneously, a component is created with an outer and an inner layer of different materials. If the nozzles are arranged next to each other, which is not shown here, a component can be formed which should have a longitudinal portion made of a harder material and a longitudinal portion parallel thereto made of a soft material. If the plastic masses are injected successively, for example, a component with a different colour or rigidity of the material is produced in individual longitudinal portions. For example, a harder component is first injected at the start of a component, a soft, resilient component in the middle part, and then again a hard, stiff component. The result is a component with high flexibility in the middle region. By means of needle valve nozzles 23', which are merely suggested in FIG. 12, a targeted interruption of the mass flow can take place in each case.

In a modification of the embodiment shown in FIG. 12, the two nozzles are housed in a separate unit belonging to the injection moulding machine, in the mould, there is only one nozzle, which is supplied alternately with the two different plastic masses.

FIG. 13, together with FIGS. 13a to 13c, shows a device 26 with sliders 27 acting as flow brakes. The device 26 has a stationary actuating strip 26a with an actuating or control cam 26b, which has a bevel 26c laterally next to the nozzle hole 2a, offset slightly in the direction of the trailing zone. The position of the nozzle hole is indicated in FIG. 13a with a dashed line. The carriage 6 is equipped with sliders 27 in the region of the channel 10. By means of a control device, these sliders 27 are actuated as soon as the relevant portion of the channel 10 has passed the nozzle 2a in the direction of the trailing zone. As a result, the flow cross-section in the channel 10 increases in the trailing zone and enables better pressure transfer into the portions of the cavity 8 which are already filled with plastic mass. The slider 27 therefore act as a flow brake in the channel 10. In FIG. 13a, the component 24a and the channel compound strand 25a are shown very schematically. FIG. 13b shows a slider 27 in its actuated position; FIG. 13c shows a slider 27 in its unactuated position.

In all variants, the separation of the channel compound strands, together with the connection compound strands and the ejection of the respective component, can already take place when the solidification process has progressed so far that these parts are dimensionally stable.

Suitable solidifiable plastic masses solidifiable plastic compounds in the context of the method according to the invention are all plastically processable materials, namely thermoplastics, thermosetting plastics, and elastomers. Depending on the type of plastic mass, the nozzles are hot channel or cold channel nozzles.

In principle, it is possible to carry out the method in such a manner and to design the device such that the mould cavity/ies are provided on stationary mould components and injected with at least one moving injection unit via movable mould components.

LIST OF REFERENCE NUMERALS

1 . . . Mould insert
2, 2', 2" . . . Nozzle
2a . . . Nozzle hole
3, 3' . . . Leading part
4, 4' . . . Trailing part
3a, 4a, 3'a, 4'a . . . Edge portion
3b, 4b, 3'b, 4'b . . . Edge surfaces
5, 5', 5" . . . Injection unit
6 . . . Carriage
7 . . . Mould insert
7a . . . Jaws
8, 8" . . . Mould cavity
9, 9' . . . Connections
10, 10' . . . Channel
10a, 10b . . . Section
12 . . . Ejector
13 . . . Heating element
14, 14' . . . Embossing device
14a . . . Embossing strip
15, 15' . . . Embossing stamp
16 . . . Support
17 . . . Mould insert
17a . . . Jaws
18 . . . Channel block
19, 20, 21 . . . Channels
22, 22' . . . Diverter valve
23, 23' . . . Needle valve nozzle
24, 24', 24" . . . Component
24'a . . . Block-like element
24" . . . Component
25a . . . Channel compound strand
25b . . . Connection compound strand
26 . . . Flow brake device
26a . . . Actuating strip
26b . . . Control cam
26c . . . Bevel
27 . . . Slider

The invention claimed is:

1. A method for producing one or more plastic parts from at least one solidifiable plastic compound in an injection moulding facility, said moulding facility comprising stationary mould components and movable mould components which are movable with respect to the stationary mould components, wherein the movable mould components contain one single mould cavity or a plurality of discrete mould cavities and the stationary mould components have at least one injection point, over which the solidifiable plastic compound is injected into an area between the stationary mould components and the one single mould cavity or the plurality of discrete mould cavities in the movable mould components during movement of the movable mould components away from the injection point, the method comprising:
   a) injecting solidifiable plastic compound into a runner formed in the movable mould components, wherein the includes a plurality of shallow portions and recessed portions;
   b) successively conveying the solidifiable plastic compound from the runner into a plurality of connection channels via the plurality of recessed portions;
   c) distributing the solidifiable plastic compound from the connection channels and either
      in successive sections into the one single mould cavity, or
      one after the other into the plurality of discrete mould cavities,
   wherein the runner in a region of the injection point, as well as in a leading zone located on one side of the injection point in a direction counter to that of the movement of the movable mould components when moving and in a trailing zone located on another side of the injection point in the direction of movement of the movable mould components when moving, is enclosed by at least one stationary, temperature-controlled mould component,
   wherein in the runner, a continuous channel compound strand is formed with attachment compound strands formed in the plurality of connection channels, wherein the attachment compound strands are transported away from the injection point with increasing cooling and solidification and increasing length of the continuous channel compound strand and together with the filled single mould cavity or the filled discrete mould cavities,
   wherein the continuous channel compound strand, together with the attachment compound strands formed in the plurality of connection channels, after their solidification and after opening the single mould cavity or the discrete mould cavities is separated from the one or more plastic parts formed in the single mould cavity or the discrete mould cavities, and
   d) the one or more plastic parts are ejected.

2. The method according to claim 1, wherein it is a discontinuous method in which the movable mould components are moved linearly.

3. The method according to claim 1, wherein it is a continuous method, in which movable mould components are continuously joined together, are filled, the one or more plastic parts are removed from the mould, and the mould components are recycled for refilling at the injection point.

4. The method according to claim 1, wherein it is a continuous method in which the movable mould components are moved along a closed circle.

5. The method according to claim 1, wherein the mould component surrounded by the runner in the leading zone is heated or cooled.

6. The method according to claim 1, wherein the mould component surrounded by the runner in the trailing zone is cooled or heated.

7. The method according to claim 1, wherein the solidifiable plastic compound fills an elongate mould cavity in portions or individual, mould cavities running in a row via the connections, which are formed in at least one mould insert are formed, which is arranged on a linearly movable carriage.

8. The method according to claim 1, wherein, after the filling of the mould cavity or all mould cavities, the movable mould components are stopped, a supply of solidified plastic compound is stopped, and step d) follows.

9. The method according to claim 1, wherein the solidifiable plastic compound partially fills a circular circumferential mould cavity in portions or individual mould cavities successively arranged in a circle via the connection channels, wherein the mould cavity or the individual mould cavities is or are provided within mould inserts which follow a circular outer circumference of a rotary unit following the circular shape directly following one another.

10. The method according to claim 1, wherein the solidified continuous channel compound strand and the solidified connection compound strands are continuously separated after emergence of the mould inserts from the trailing zone by means of successively opening the mould inserts.

11. The method according to claim 1, wherein the mould inserts are successively opened completely, either the component formed in the respective cavity is ejected or the component continuously formed in the mould cavity extending in a circle is partially removed from the mould, wherein the mould inserts are then closed in sequence and, during continuous rotation of the rotary unit, successively enter the leading zone again.

* * * * *